Patented Sept. 30, 1941

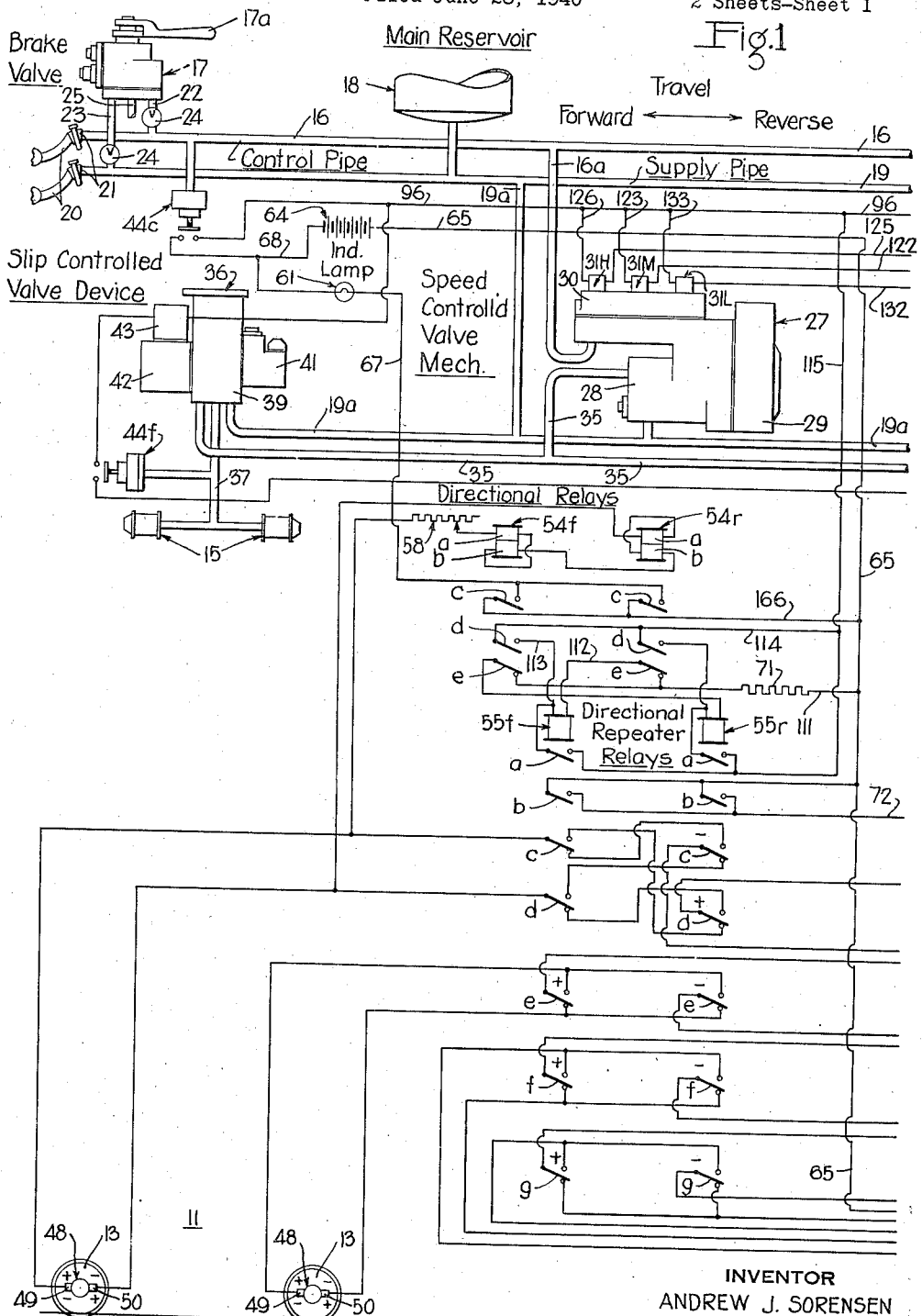

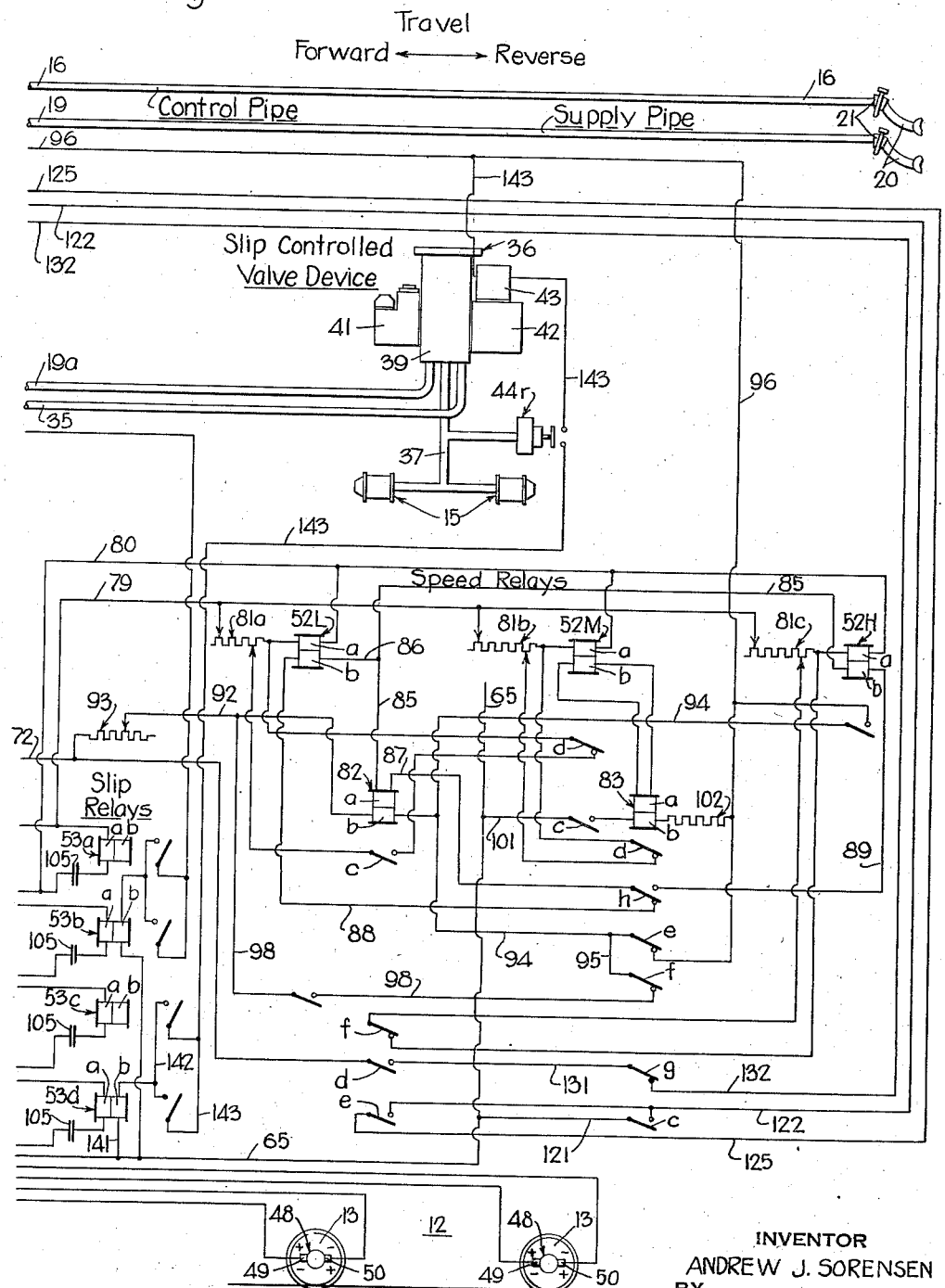

2,257,311

UNITED STATES PATENT OFFICE 2,257,311

BRAKE CONTROL MEANS

Andrew J. Sorensen, Edgewood, Pa., assignor to The Westinghouse Air Brake Company, Wilmerding, Pa., a corporation of Pennsylvania Application June 28, 1940, Serial No. 342,941

33 Claims. (Cl. 303—21)

This invention relates to brake control means for vehicles, such as railway cars and trains, and has particular relation to brake control apparatus adapted to automatically reduce the degree of application of the brakes on the vehicle as the speed of the vehicle reduces and at the same time effective to rapidly reduce the degree of application of the brakes associated with individual wheel units or groups of wheel units in the event that one or more of the wheel units of a group begin to slip, in order to prevent the sliding of the wheels.

As is well known to those skilled in the art, the coefficient of friction between the brake shoes and the rim of a railway car wheel increases as the speed of rotation of the wheel decreases. Accordingly, if a given fluid pressure is maintained in the brake cylinder operating the brake shoes, the degree of application of the brakes on the wheel automatically increases as the speed of the car decreases. If the degree of application of the brakes increases sufficiently as the speed of the vehicle reduces so as to cause the adhesion or rolling friction between a wheel and the rails or road surface on which the wheel rolls to be exceeded, the wheel promptly decelerates at an abnormally rapid rate to a locked or non-rotative condition and slides.

In the present application, the term "slide" refers to the dragging of a vehicle wheel along a rail or road surface in a locked or non-rotative condition. The term "slip" refers to the rotation of a vehicle wheel at a speed less than a speed corresponding to vehicle or car speed at a given instant. Thus when a vehicle wheel decelerates at an abnormally rapid rate toward a locked or non-rotative condition, the wheel is said to slip but the wheel does not slide until it is actually locked. The distinction between these two terms should be borne in mind.

Operators of railway cars and trains customarily manually reduce the degree of application of the brakes, as the speed of the car or train reduces, in order to prevent the degree of application of the brakes increasing sufficiently with the increase in the coefficient of friction between the brake shoes and the car wheels resulting from the reducing speed to cause sliding of the wheels. More recently, especially on high speed passenger trains, a mechanical speed governor has been employed for the purpose of reducing the degree of application of the brakes automatically and independently of any action by the operator as the speed of the car or train reduces in order to maintain a safe limit of application so as to prevent sliding of the wheels. It will be understood that sliding of railway car wheels is objectionable because of the development of flat spots on the wheels which necessitate repair or replacement of such wheels.

Notwithstanding the manual or automatic reduction in the degree of application of the brakes as the speed of a car or train reduces, sliding of the car wheels nevertheless sometimes occurs because of the non-uniformity of rail conditions and thus of the adhesion between the rails and wheels. It has accordingly been proposed to provide devices, either of a mechanical or an electrical nature, which are sensitive only to a slipping condition of a wheel for automatically effecting a rapid reduction in the degree of the brakes associated with a slipping wheel or wheel unit so as to cause the slipping wheel or wheel unit to cease deceleration and begin acceleration thereof back toward a speed corresponding to car speed before the slipping wheel or wheel unit can decelerate to a locked or non-rotative condition and slide.

It has further been proposed to provide apparatus responsive to the pressure in the brake cylinders for causing the rapid reduction of pressure in the brake cylinders, initiated in response to the operation of the wheel-slip responsive devices, to continue until the pressure in the brake cylinders is reduced below a certain low value so as to insure the acceleration of the slipping wheel or wheels back toward a speed corresponding to car speed and at the same time inhibit the reapplication of the brakes by resupply of fluid under pressure to the brake cylinders until the slipping wheel or wheels have been restored fully to a speed corresponding to vehicle speed. It will be understood that the time required for a slipping wheel to be restored to a speed corresponding to car speed, although variable, is less than the time ordinarily required for the pressure in the brake cylinders to be reduced below the certain low value. Thus the reduction of pressure in the brake cylinders associated with slipping wheels continues and the resupply of fluid under pressure to the brake cylinders and the consequent reapplication of the brakes does not occur until after the slipping wheels are restored fully to a speed corresponding to car speed.

In the copending application Serial No. 306,878 of Donald L. McNeal and John Canetta, filed November 30, 1939, and assigned to the assignee of this application, there is disclosed a brake control equipment for vehicles, such as railway cars and trains, in which electrical apparatus responsive to the speed of rotation of one car wheel or wheel unit and electrical apparatus responsive to the rate of rotative deceleration and acceleration of all the car wheels or wheel units automatically control the degree of application of the brakes on a car or train in accordance with the speed of the car or train and, at the same time, effect the rapid reduction in the degree of application of the brakes associated with a slipping wheel unit to prevent the sliding of the wheels.

My present invention is designed to accomplish in general the same objectives as are accomplished by the equipment disclosed in the above-mentioned copending application. In the development of a practical system for actual commercial installation I have, however, been confronted with numerous problems in the carrying out of these objectives and have accordingly devised a novel and improved apparatus differing specifically from that disclosed in the copending application and adapted to function satisfactorily in commercial service.

For example, in the above-mentioned copending application an electrical governor in the form of a magneto or direct-current generator driven according to the speed of rotation of a wheel unit of a vehicle supplies a voltage which is substantially proportional to the speed of rotation of the wheel unit, and consequently to the speed of travel of the car or vehicle, and a plurality of voltage-responsive relays of the neutral type are arranged so as to be respectively operative in response to different successively spaced voltages, corresponding to different speeds of the vehicle, for effecting the corresponding control of the degree of application of the brakes in accordance with the speed of the vehicle. I have found that the characteristics of the neutral type of relay are such as to render difficult the accurate and uniform response of relays at given vehicle speeds. I have found it desirable to provide voltage-responsive relays of the so-called uni-directional type, that is, responsive to flow of current in only one direction through the operating winding thereof, for the reason that they are more sensitive and more accurate in operation. The provision of voltage-responsive relays of the uni-directional type involves the necessity for control apparatus responsive to the direction of rotation of the vehicle wheels and consequently of the direction of travel of the vehicle for insuring the proper direction of flow of current through the operating windings of the relays notwithstanding reversal of the direction of rotation of the wheels and consequently of the direction of travel of the vehicle.

It is accordingly an object of my invention to provide a novel speed-controlled brake equipment for vehicles including a so-called electrical governor and voltage-responsive relays of the uni-directional type, together with directional control apparatus for insuring operation of the voltage-responsive relays notwithstanding reversal of the direction of rotation of the vehicle wheels and consequently of the direction of travel of the vehicle.

The arrangement of the voltage-responsive relays in the copending application above-mentioned is such that if the electrical governor should fail for some reason, a minimum degree of application of the brakes will be effected. In order to enable a higher and more adequate degree of application of the brakes to be effected in the event of failure of the electrical speed governor, manual control means was provided in the copending application whereby an adequate degree of braking could be secured.

It is another object of my present invention to provide means for automatically insuring an adequate degree of application of the brakes in the event that the electrical speed governor should fail, thereby obviating need for the human element required with the apparatus shown in the copending application.

It is another object of my invention to provide brake control apparatus of the type indicated in the foregoing objects and further characterized by apparatus sensitive to a slipping condition of individual wheel units of a group for rapidly reducing the degree of application of the brake associated with all the wheel units of that group to prevent sliding thereof.

Another object of my invention is to provide equipment of the character indicated in the foregoing object and characterized by a novel arrangement for insuring reduction of the pressure in the brake cylinders associated with the slipping wheels until the pressure in the brake cylinders reduce below a certain low value.

The above objects and other objects of my invention which will be made apparent hereinafter, are attained by means of one embodiment of a brake control equipment shown in Figs. 1 and 2 of the accompanying drawings when placed in side-by-side relation.

DESCRIPTION OF EQUIPMENT (a) *Introduction*

Before proceeding to a description of the equipment, it should be understood that the equipment as shown does not correspond exactly to the commercial brake control equipment to which my invention pertains and in which it is employed. My invention is intended to be applied to the type of brake control equipment for high speed passenger trains referred to as the HSC type of equipment and described in various instruction pamphlets of The Westinghouse Air Brake Company, one of which is Instruction Pamphlet 5064, Sup. 13. It should be understood, therefore, that while I have represented a simplified form of pneumatic control apparatus whereby the control of the brakes associated with the car wheels is effected under the control of the operator, my invention is not limited in its application to the specific type of pneumatic operator-controlled brake apparatus shown.

The equipment shown in the combined Figs. 1 and 2 is that for two wheel trucks 11 and 12. Obviously, in the case of articulated cars employed in the modern high speed streamlined trains one wheel truck may support adjacent ends of two cars. It should be understood, therefore, that although the equipment is hereinafter described as for a single car of the non-articulated type in which each car is independently supported by wheel trucks at opposite ends thereof, the equipment may be employed for cars of the articulated type.

In the subsequent description of my invention, it will be assumed that movement of the vehicle in the left-hand direction corresponds to forward travel of the vehicle and that movement of the vehicle in the right-hand direction corresponds to reverse travel of the vehicle. This is indicated by the arrows and legend at the top of each figure. The truck 11 will hereinafter accordingly be designated the front wheel-truck and truck 12 will be designated the rear wheel-truck.

The wheel-trucks 11 and 12 may be the conventional type of four-wheel truck on railway cars, each truck having a trailing and a leading wheel-unit respectively comprising a pair of wheels rolling on opposite track rails and connected by an axle to which they are fixed. It will be apparent that in the drawings only one wheel 13 of each wheel-unit of each truck is shown. It should be understood that my invention is applicable to railway locomotives of the electric or Diesel type and that the wheel-units shown may be the wheel units of the locomotive or power unit.

While not shown, it will be understood that the brakes associated with the wheels 13 may be of the conventional clasp type operated through conventional brake rigging by brake cylinders 15. While any desired number of brake cylinders may be provided for each wheel truck, I have shown only one brake cylinder for each wheel-unit, that is, for each pair of axle-connected wheels. Thus, in the case of a car wheel-truck, there are two brake cylinders for each truck, shown in a vertical line above the corresponding truck.

Fluid under pressure is supplied to the brake cylinders 15 to effect application of the brakes associated with the wheels 13 and released from the brake cylinders 15 to effect the release of the brakes under the control of the operator of the vehicle through the medium of suitable apparatus shown, in simplified form, as comprising a so-called control pipe 16 the pressure in which is controlled by means of an operator-controlled brake valve device 17. The brake valve 17 is of well-known self-lapping type having an operating handle 17a fixed to a rotary operating shaft through the medium of which the self-lapping valve mechanism is operated. The source of fluid under pressure for charging the control pipe 16 is a reservoir 18, hereinafter referred to as the main reservoir, which is suitably charged to a normal pressure, such as one hundred pounds per square inch, by means of a fluid compressor not shown. Main reservoir 18 is connected to and constantly charges to a corresponding pressure a pipe hereinafter designated the supply pipe 19.

In the case of a train of cars, the control pipe 16 and supply pipe 19 may comprise sections extending from end-to-end of each car and connected by suitable hose couplers 20 at the opposite ends thereof between the cars. Angle cocks 21 are provided, in the usual manner, at each end of each pipe to close the end of the pipe section on a car when desired.

The brake valve 17 is connected to the control pipe 16 and the supply pipe 19 by branch pipes 22 and 23 respectively in which are interposed suitable manually operated valves 24. The valves 24 are in open position when the brake valve 17 is employed for controlling the pressure in the control pipe 16. When it is desired to control the pressure in the control pipe 16 from another car, the brake valve 17 may be cut out of operation by closing the valves 24. Unless otherwise indicated, it will be assumed that the valves 24 are in open position and that the brake valve 17 controls the pressure in the control pipe 16.

With the brake valve handle 17a in its normal brake release position, the self-lapping valve mechanism of the brake valve 17 is conditioned to effect the exhaust of fluid under pressure from the control pipe 16 through an exhaust port and pipe 25 of the brake valve. When the brake valve handle 17a is shifted in one direction in a horizontal plane out of its brake release position into a so-called application zone, the self-lapping valve mechanism of the brake valve 17 is operated to cause fluid under pressure to be supplied from the supply pipe 19 and the connected main reservoir 18 to control pipe 16 to charge it to a pressure corresponding substantially to the degree of displacement of the brake valve handle out of its normal brake release position. If the pressure in the control pipe 16 tends to reduce for some reason, such as leakage, the self-lapping mechanism of the brake valve automatically operates to maintain a pressure in the control pipe corresponding to the position of the brake valve handle.

(b) Speed-controlled valve mechanism 27

A so-called speed-controlled valve mechanism 27 of well-known construction is provided to supply fluid at a pressure depending upon the pressure in the control pipe 16, but having variable ratios thereto depending upon the speed of travel of the vehicle, to effect the application of the brakes. A valve mechanism of this type is described in detail and claimed in Patent No. 2,140,624 to Ellis E. Hewitt.

Essentially, the speed-controlled valve mechanism 27 is made up of three sections referred to hereinafter respectively as the relay valve section 28, the diaphragm section 29 and the magnet valve section 30.

The relay valve section 28 comprises a supersensitive high capacity self-lapping relay valve mechanism of well-known type which is operated in response to an operating force exerted by fluid pressure responsive means in the form of four coaxially spaced unconnected movable abutments or diaphragms of progressively increasing or decreasing effective pressure areas contained in the diaphragm section 29.

The four diaphragms may have any desired ratio of effective pressure areas relative to one another but for illustrative purposes it will be assumed that they have effective pressure areas of ten, eight, six, and four units of area respectively. The diaphragms are arranged with the largest diaphragm adjacent the relay valve section 28 so that one face of the largest diaphragm is subject to the pressure in a pressure chamber of the relay valve section 28 and the opposite face is subject to the pressure of fluid in a chamber formed between the largest diaphragm and the next succeeding diaphragm of eight units of area. Due to the coaxial spaced relation of the diaphragms, similar chambers are formed between each successive pair of diaphragms. A chamber is also formed at the outside face of the smallest diaphragm.

Fluid under pressure is supplied at all times to the chamber at the outside face of the smallest diaphragm, and selectively to the three chambers between successive pairs of diaphragms under the control of three magnet valve devices 31H, 31M, and 31L of the magnet valve section 30, from a branch pipe 16a of the control pipe 16.

The operating force for the relay valve section 28 accordingly depends not only upon the unit pressure of the fluid supplied to the chambers between the diaphragms but also the area of the particular diaphragm which is effective to exert the operating force.

When the magnet winding of magnet valve 31H is deenergized it causes fluid under pressure to be vented to atmosphere from the chamber between the largest diaphragm and the next succeeding smaller diaphragm; and when the magnet winding of magnet valve 31H is energized, it causes communication to be established through which fluid under pressure is supplied from the branch pipe 16a to said chamber.

When the magnet winding of magnet valve 31M is deenergized, it causes fluid under pressure to be vented to atmosphere from the chamber formed between the two intermediate diaphragms; and when the magnet winding of magnet valve 31M is energized, it causes communication to be established through which fluid under pressure is supplied from the branch pipe 16a to said chamber.

When the magnet winding of magnet valve 31L is deenergized it causes communication to be established through which fluid under pressure is supplied from the branch pipe 16a to the chamber between the smallest diaphragm and the next succeeding larger diaphragm; and when the magnet winding of magnet valve 31L is energized, it causes fluid under pressure to be vented from said chamber.

It will accordingly be seen that when the magnet windings of magnet valves 31H and 31M are deenergized and that of the magnet valve 31L is energized, all of the chambers between the diaphragms are vented. The chamber at the outside face of the smallest diaphragm being constantly connected to and charged with fluid under pressure from the branch pipe 16a, the operating force for the relay valve section 28 is accordingly the unit pressure of the fluid supplied from the control pipe 16 to said chamber multiplied by the area of the smallest diaphragm.

Upon the application of the operating force thereto, the relay valve section 28 operates to supply fluid under pressure from a branch pipe 19a of the supply pipe 19 to a pipe 35 leading to two slip-controlled valve devices 36, one of which is provided for each wheel truck 11 and 12 respectively. As will hereinafter appear, the slip-controlled valve devices 36 are relay valve devices which normally operate to supply fluid under pressure from the branch pipe 19a of the supply pipe to a pipe 37 leading to the brake cylinders 15 of the corresponding wheel truck, in accordance with the pressure of the fluid delivered to the pipe 35.

The pressure delivered by the relay valve section 28 of the speed-controlled valve mechanism 27 to the pipe 35 is effective in the pressure chamber of the relay valve section 28 on one side of the largest diaphragm to exert a force in opposition to the force exerted by the effective diaphragm to lap or close off the supply of fluid under pressure to the pipe 35. Accordingly, the pressure established in the pipe 35 when the smallest diaphragm is effective to operate the relay valve section depends upon the ratio of the effective pressure area of the smallest and largest diaphragms. If, as previously assumed, the largest and the smallest of the diaphragms have effective pressure areas of ten and four units of area respectively, it will be seen that the self-lapping relay valve section 28 will establish a pressure in the pipe 35 which is forty percent of that in the control pipe when the smallest diaphragm is effective.

When the magnet windings of all of the magnet valves 31H, 31M, and 31L are deenergized, fluid under pressure is supplied not only to the chamber at the outside of the smallest diaphragm but also to the chamber between the smallest diaphragm and the larger diaphragm. Accordingly, the fluid pressure forces on the smallest diaphragm are balanced whereas the unbalanced force on the next to the smallest diaphragm is effective to operate the relay valve section 28. In such instance, assuming an effective pressure area of six units for the diaphragm effective in this instance, it will be seen that the relay valve section 28 establishes a pressure in the pipe 35 which is sixty percent of that established in the control pipe 16.

When the magnet valve 31M only is energized, fluid under pressure is supplied to the chamber at the outside of the smallest diaphragm, to the chamber between the smallest and the next larger diaphragm, and also to the chamber between the two intermediate diaphragms. Thus the fluid pressure forces on the smaller two diaphragms are balanced and the unbalanced force on the next to the largest diaphragm (of eight units of area) is effective to operate the relay valve section 28. In such case, the relay valve section 28 establishes a pressure in the pipe 35 which is eighty percent of the pressure established in the control pipe 16.

When the magnet windings of magnet valves 31H and 31M are energized while that of the magnet valve 31L is deenergized, fluid under pressure is supplied to the chamber at the outer face of the smallest diaphragm and to all of the chambers between successive pairs of diaphragms. In such case, the fluid pressure forces on all the diaphragms except the largest diaphragm are balanced so that the unbalanced force on the largest diaphragm is effective to operate the relay valve section 28. The relay valve section 28 is thus operated to establish a pressure in the pipe 35 which is substantially equal to the pressure in the control pipe 16.

It will thus be seen that by selectively energizing or deenergizing the magnet windings of magnet valves 31H, 31M, and 31L of the speed-controlled valve mechanism 27 in different combinations, the pressure supplied to the slip-controlled valve devices 36 and correspondingly to the brake cylinders 15 may be varied with respect to the pressure established in the control pipe 16.

Each of the magnet valves 31H, 31M, and 31L is effective to vent fluid under pressure from the diaphragm chamber controlled thereby at a controlled rate so that when the combination of magnet valves in effect is changed so as to effect a reduction of the pressure of fluid supplied to pipe 35 to a lower percentage of the pressure established in the control pipe 16, such reduction is not instantaneous but at a controlled rate. The reason for this will be made apparent hereinafter.

(c) Slip-controlled valve devices 36

Each of the slip-controlled valve devices 36 is made up of three sections, namely an intermediate pipe bracket section 39 to opposite faces of which are secured a self-lapping relay valve section 41, of the type described in Patent 2,096,491 to Ellis E. Hewitt, and a magnet valve section 42 having a magnet valve of standard double beat type including a magnet winding 43.

The pipes 19a, 35 and 37 are connected to the pipe bracket section 39 and lead through appropriate passages to parts of the valve device 36 in the manner presently to be described.

When the magnet winding 43 of the magnet valve section 42 is deenergized, the magnet valve establishes communication through which fluid under pressure from the pipe 35 flows to a pressure chamber at one side of the operating abutment or piston of the relay valve section 41. The relay valve section 41 accordingly operates to supply fluid under pressure from the branch pipe 19a of the supply pipe 19 to the pipe 37 leading to the brake cylinders 15, the pressure etablished in the brake cylinders 15 corresponding substantially to the pressure established in the pipe 35. Upon the reduction of the pressure in the pipe 35, the relay valve section 41 operates to vent fluid under pressure from the brake cylinders 15 through an independent exhaust port not visible in the drawings to effect a reduction of the pressure in the brake cylinders 15 corresponding to the reduction of the pressure in the pipe 35. Thus the relay valve section 41 is effective to establish a pressure in the brake cylinders 15 which at all times corresponds to the pressure in the pipe 35 as long as the magnet winding 43 of the magnet valve section 42 is deenergized.

When the magnet winding 43 of the magnet valve section 42 is energized, the communication between the pipe 35 and the pressure chamber at one side of the operating piston of the relay valve section 41 is closed and an exhaust communication established through which fluid under pressure from the said pressure chamber is vented to atmosphere at a rapid rate. Accordingly, whenever the magnet winding 43 of the slip-controlled valve device 36 is energized, the relay valve section 41 operates to rapidly reduce the pressure in the brake cylinders 15 controlled thereby and to continue such reduction as long as the magnet winding 43 is energized. It will thus be apparent that the slip-controlled valve devices 36 control the pressure of the fluid in the brake cylinders 15 of the corresponding wheel-truck only whereas the speed-controlled valve mechanism 27 is effective to control the pressure of the fluid in the brake cylinders for both wheel trucks 11 and 12.

(d) *Pressure switches 44c, 44f and 44r*

Associated with the control pipe 16 and each of the brake cylinder pipes 37 leading to the brake cylinders of each wheel truck are fluid pressure controlled switch devices 44c, 44f and 44r respectively, hereinafter called pressure switches. These pressure switches may be of any suitable well-known type, preferably the snap-acting type in which a movable contact member is snapped into and out of engagement with a pair of stationary contact members in response to an increase of a control pressure supplied to the pressure switch above a critical pressure and reduction below such critical pressure, respectively. In the case of the pressure switch 44c, the movable contact member thereof is actuated to its closed position in response to an increase of pressure in the control pipe 16 above a certain low pressure, such as five pounds per square inch, and is restored to its open position in response to a decrease of pressure in the control pipe below such pressure. In the case of each of the pressure switches 44f and 44r, the movable contact member thereof is actuated to closed position in response to an increase of pressure in the corresponding brake cylinders above a certain low pressure, such as five pounds per square inch, and restored to its open position upon a decrease of pressure in the corresponding brake cylinders below such pressure. The function of the pressure switches 44c, 44f, and 44r will be made apparent hereinafter.

(e) *Electrical control apparatus*

Associated with one or more or, as indicated in the drawings, all of the wheel units of the vehicle are magnetos or generators 48 of the direct-current type, the rotary armature of the generators being driven in accordance with the rotative speed of the corresponding wheel units and adapted to produce a voltage at the brush terminals 49 and 50 of the generators which is substantially proportional to such rotative speed. These generators 48 may be mounted in any suitable manner as for example in the journal casing at the end of an axle connecting a pair of wheels with the rotary armature of the generator disposed in coaxial relation to and coupled to the end of the axle.

A plurality of relays 52L, 52M, and 52H, hereinafter referred to as the speed relays, are provided and controlled respectively according to the voltage supplied by one of the generators, shown as the generator 48 associated with the left-hand or leading wheel-unit of the wheel-truck 11. As will hereinafter appear, the speed relays 52L, 52M, and 52H are adapted to function in a cooperative and coordinated manner to effect the selective energization and deenergization of the magnet valves 31H, 31M, and 31L of the speed-controlled valve mechanism 27.

A plurality of relays 53a, 53b, 53c, and 53d hereinafter referred to as the slip relays are provided, one for each of the wheel units respectively, and arranged to operate in a manner presently to be described in response to the rate of change of voltage delivered by the generators 48 of the corresponding wheel units. The slip relays 53a and 53b corresponding respectively to the two wheel-units of the wheel-truck 11 are effective to control energization of the magnet winding 43 of the slip-controlled valve device 36 corresponding to the wheel-truck 11. In a similar manner, the slip relays 53c and 53d are effective to control energization of the magnet winding 43 for the slip-controlled valve device 36 corresponding to the rear wheel-truck 12.

As will be made more clear hereinafter, the speed relays and the slip relays are of the so-called uni-directional type responsive only to the flow of current through an operating winding thereof in one direction and non-responsive to the flow of current through the operating winding in the opposite direction. It is necessary, therefore, because of the reversal of polarity of the brush terminals 49 and 50 of the generators 48 due to reversal of the direction of rotation of the wheels with reverse travel of the vehicle to provide a directional control apparatus for insuring the uni-directional flow of current through the operating winding of the speed relays and slip relays. I accordingly provide, according to my invention, a pair of so-called directional relays 54f and 54r and a pair of so-called directional-repeater or repeater relays 55f and 55r. The directional relays 54f and 54r are of the uni-directional type operatively responsive only to flow of current through an operating winding thereof in one direction and non-responsive to the flow of current through the winding in the opposite direction.

It will be observed that the speed relays, the slip relays, and the directional relays are all uni-directional relays and as a practical matter are of substantially identical construction and design. The response of the relays to different voltages is provided for by means of adjustable resistors external to the relays in the manner hereinafter to be pointed out.

Each of the uni-directional relays comprises two operating windings $a$ and $b$ respectively and a varying number of contact members depending upon the function of the relay.

The operating windings of the directional relays 54$f$ and 54$r$ are connected in series relation across the brush terminals of one of the generators, indicated as the generator 48 associated with the left-hand wheel unit of the wheel-truck 11. The circuit for energizing these relays includes a rheostat or adjustable resistor 58 whereby to suitably control the current energizing the relay windings.

In the subsequent description of the operation of the equipment it will be assumed that when the vehicle is traveling in a forward direction, the brush terminal 49 of each of the generators 48 is of positive polarity whereas the brush terminal 50 is of negative polarity. Conversely, when the vehicle travels in the reverse direction, it will be assumed that the polarity of the brush terminals will be reversed, that is, that the brush terminal 50 will be of positive polarity and the brush terminal 49 of negative polarity.

The operating windings $a$ and $b$ of the directional relays 54$f$ and 54$r$ are so connected in the energizing circuit therefor that only one of the relays is responsive to a flow of current in one direction whereas only the other relay is responsive to flow of current in the circuit in the opposite direction. Assuming a flow of current from the positive brush terminal to the negative brush terminal of generator 48 it will, therefore, be seen that when the vehicle travels in the forward direction, the flow of current in the circuit of the directional relays is such as to cause an operative response only of the directional relay 54$f$. Conversely, when the vehicle travels in the reverse direction, and the current to the directional relay windings is reversed, the directional relay 54$r$ only is operatively responsive.

The rheostat 58 is so adjusted that when the speed of the vehicle exceeds a certain low speed such as eight miles per hour, the current energizing the windings of the directional relays becomes sufficient to cause an operative response of the contact members to a picked-up position, the contact members being maintained in a picked-up position as long as the speed of the vehicle exceeds such speed and being restored to the dropped-out position thereof whenever the vehicle speed reduces substantially below the critical operating speed or current.

Each of the directional relays 54$f$ and 54$r$ is provided with two front contacts $c$ and $d$ and a back contact $e$. It will be understood that, as employed herein, a front contact is one which is in open position when the relay is dropped-out and which is actuated to a closed position when the relay is picked-up, whereas a back contact is one which is in closed position when the relay is dropped-out and is actuated to open position when the relay is picked-up.

The contacts $c$ of the two directional relays 54$f$ and 54$r$ are connected in parallel relation in a circuit including an indicating lamp 61 which is located in a convenient position adjacent the brake valve 17 and visible at all times by the operator of the vehicle. Since one or the other of the directional relays 54$f$ and 54$r$ will always be picked-up when the vehicle is traveling at a speed above the critical pick-up speed of the directional relays if the generator 48 supplying the current for energizing the relays is operating properly, it will be seen that the resulting illumination of the indicating lamp 61 will serve as an indication to the operator that the corresponding generator 48 is functioning properly. It is important that the operator be apprised of the proper operating condition of the generator 48 associated with the speed relays 52L, 52M, and 52H in order that he may know in advance if he may depend upon the proper response of the speed relays.

The circuit for energizing the indicating lamp 61 extends from the positive terminal of a source of current such as a storage battery 64 by way of a so-called positive battery wire 65, a branch wire 166, in parallel through one or the other of the contact members contact $c$ of the directional relays 54$f$ and 54$r$, a wire 67 including the filament of the indicating lamp 61, and a wire 68 to the negative terminal of the battery 64. The battery 64 is preferably the usual car-lighting battery provided with suitable charging equipment (not shown) for maintaining the battery charged. The terminal voltage of the battery 64 may be any suitable desired value such as 64 or 32 volts.

The contact $d$ of the directional relay 54$f$ controls a circuit for energizing the operating winding of the repeater relay 55$f$ to cause it to be operated to a picked-up position.

In a similar manner, the contact $d$ of the directional relay 54$r$ controls a circuit for energizing the winding of the repeater relay 55$r$ to cause it to be operated to a picked-up position.

The circuit for energizing the winding of the repeater relay 55$f$ includes the back contact $e$ of the directional relay 54$r$. Conversely, the circuit for energizing the winding of the repeater relay 55$r$ includes the back contact $e$ of the directional relay 54$f$. The contacts of the two directional relays 54$f$ and 54$r$ are thus so interlocked that only one of the repeater relays 55$f$ and 55$r$ can be operatively picked-up at one time.

The circuit for energizing the respective windings of the repeater relays 55$f$ and 55$r$ will be hereinafter traced in detail in connection with the operation of the equipment but it may be here briefly stated that a resistor 71 is provided in the energizing circuit of these relays for suitably controlling the energizing current thereof.

The repeater relays 55$f$ and 55$r$ are of the neutral type having an operating winding which is effective to cause pick-up of the contact members of the relay when energized by flow of current therethrough in either direction. As will be made apparent hereinafter, however, current flows through the windings of the repeater relays 55$f$ and 55$r$ always in the same direction. Repeater relays 55$f$ and 55$r$ are of the neutral type because relays of the neutral type cost less than relays of the uni-directional type and because they are adapted to be operated by higher current than the uni-directional relays and thus provide adequate power for operating the large number of contacts required for effecting the reversing control of the circuits including the speed relays and the slip relays.

Each of the repeater relays 55$f$ and 55$r$ is provided with two front contacts $a$ and $b$ and five so-called front-and-back contacts $c$, $d$, $e$, $f$, and $g$. The front-and-back contacts engage a lower stationary contact in the dropped-out position thereof and an upper stationary contact in the picked-up position of the relay.

The contact a of each of the repeater relays 55f, 55r is a so-called "stick" contact for establishing a holding circuit to maintain the winding of the relay energized independently of the corresponding directional relay 54f or 54r once the energizing circuit for the repeater relay winding is established. The contacts b of the repeater relays 55f and 55r are arranged in parallel relation so that when either of the directional relays is picked-up, the positive battery wire 65 is connected to a wire 72 for a purpose hereinafter to be made apparent.

The back-and-front contacts c and d of the two repeater relays 55f and 55r are arranged in such manner as to reverse the connections between a pair of bus wires 79 and 80, across which the operating winding a of each of the speed relays 52L, 52M, and 52H is connected, and the brush terminals 49 and 50 of the generator 48 associated with the left-hand wheel unit of the front wheel truck 11 in response to a reversal of polarity of the brush terminals so as to maintain a uniform polarity of voltage on wires 79 and 80 and thus a uni-directional flow of current through the operating windings a of the speed relays. These contacts c and d of the repeater relays 55f and 55r also serve at the same time to reverse the connections of the operating coil a of the slip relay 53a to the brush terminals 49 and 50 of the same generator.

Each pair of the back-and-front contacts e, f, and g of the repeater relays 55f and 55r cooperate respectively to reverse the connections of the operating winding a of one of the slip relays 53b, 53c, 53d to the brush terminals 49 and 50 of the generator for the corresponding wheel units.

It will be observed that two back-and-front contacts c and d of each of the repeater relays 55f and 55r are employed in controlling the application of generator voltage to the speed relay bus wires 79 and 80, whereas only one back-and-front contact of each of the directional relays 55f and 55r is employed to provide directional control for the winding a of the slip relays 53b, 53c, and 53d. The reason for the extra set of back-and-front contacts in the case of the bus wires 79 and 80 is to prevent any possibility of short-circuiting the armature winding of the generator 48 supplying energizing current to the directional relays 54f and 54r. If, while one of the repeater relays 55f or 55r is being picked-up, a short-circuit is established across the armature winding of the generator 48 supplying current to the winding of the directional relays 54f and 55r, the directional relay tending to pick-up will immediately drop out thus causing the corresponding repeater relay to drop-out immediately. This operation will repeat itself indefinitely. In order to prevent such an occurrence, therefore, and to insure the proper operation of the directional relays 54f and 54r, the two pairs of contacts c and d are employed. The generators 48 not having directional relays 54f and 54r dependent thereupon may be momentarily short-circuited when one or the other of the repeater relays 55f and 55r is being picked-up because no undesirable result occurs.

Referring now to the speed relays 52L, 52M, and 52H, the respective operating windings a of the relays are connected across the bus wires 79 and 80 in series with a rheostat or adjustable resistor 81a, 81b, and 81c respectively. The resistors 81a, 81b, 81c are adjusted to different resistances so as to cause pick-up of the speed relays 52L, 52M, and 52H at different voltages across the bus wires 79 and 80. For example, these resistors may be adjusted to have values of three thousand ohms, six thousand ohms, and ten thousand ohms respectively. It will thus be seen that although the windings of the speed relays 52L, 52M, and 52H may be identical in design, the relays themselves are operatively picked-up at different voltages. For example, when the voltage across the bus wires 79 and 80 exceeds a value corresponding to a vehicle speed of twenty miles per hour the current through the winding a of the speed relay 52L becomes sufficient to cause an operative response or pick-up of the relay. Similarly, when the voltage impressed on the bus wires 79 and 80 increases above a value corresponding to vehicle speed of forty miles per hour, the current through the winding a of the relay 52M becomes sufficient to cause an operative response or pick-up of the relay. In a similar manner also when the voltage across the bus wires 79 and 80 increases above a value corresponding to a speed of seventy miles per hour, the current through the winding a of the speed relay 52H becomes sufficient to cause an operative response or pick-up of the relay.

It is characteristic of electrical relays that when the movable armature actuating the contacts of the relay is shifted to a picked-up position, the air-gap between the armature and the usual stationary core of the relay is so reduced that a lesser current is required to maintain the armature in picked-up position than was originally required to cause it to be picked-up. For this reason, the contacts of the relay do not drop-out at the same voltage at which they were picked-up but remain picked-up until the control voltage of the relay has dropped a substantial amount below the voltage required to pick the relay contacts up.

In order to cause the contact members of the speed relays 52L, 52M, and 52H to pick-up and drop-out at substantially the same voltage impressed on the windings a of the relays and, therefore, at substantially the same vehicle speed, respectively, a portion of each of the resistors 81a, 81b, and 81c is shunted when the associated speed relay is dropped-out and this portion of the resistor is cut into the circuit with the winding a of the corresponding speed relay by removing the shunt connection thereon when the corresponding relay is picked-up. The manner in which this shunt connection on a portion of the resistors 81a, 81b, and 81c is established and removed will be described presently.

Associated with the speed relays 52L, 52M, and 52H are two additional or auxiliary relays 82 and 83. The relays 82 and 83 are similar in that both relays have two windings designated respectively the upper winding a and the lower winding b. The relay 82 is provided with three front contacts designated c, d, and e respectively and with one back contact designated f. The relay 83 is provided with one front contact c, four back contacts designated d, e, f, and g respectively, and a so-called transfer contact h of the back-and-front type.

One terminal of the upper winding a of relay 82 is connected by a wire 85 to one terminal of the winding b of speed relay 52H and by a branch wire 86 of wire 85 to one terminal of the winding b of the speed relay 52L. The other terminal of the upper winding a of the relay 82 is connected by a wire 87 to the contact h of the relay 83. The contact h of the relay 83 in the dropped-out position thereof engages a lower stationary contact that is connected by a wire 88 to the terminal of the winding b of the speed relay 52L opposite to the said one terminal. In its picked-up position the contact h of relay 83 engages an upper stationary contact that is connected by a wire 89 to the terminal of winding b of speed relay 52H opposite the said one terminal thereof. It will thus be seen that when the contact h of relay 83 is in its dropped-out position, the upper winding a of the relay 82 and the winding b of the speed relay 52L are connected in series relation while the circuit for the winding b of the speed relay 52H is open. Conversely, when the contact h of the relay 83 is in its picked-up position, the circuit for the winding b of the speed relay 52L is open and a circuit is established including the upper winding a of the relay 82 and the winding b of the speed relay 52H in series relation. The purpose of these connections will be made apparent presently.

One terminal of the lower winding b of the relay 82 is connected by a wire 92 including an adjustable resistor 93 to the wire 72. The other terminal of the lower winding b of the relay 82 is connected by a wire 94 to the contact e of relay 83 and to the single front contact of speed relay 52H, and by a branch wire 95 to the contact f of the relay 83. In its dropped-out position, the contact e of the relay 83 engages a stationary contact member which is connected by a wire 96, hereinafter referred to as the negative battery wire, which is connected by the pressure switch 44c to the wire 68, in turn connected to the negative terminal of the battery 64. Assuming that the pressure switch 44c is closed and that one or the other of the directional-repeater relays 55f or 55r is picked-up, a circuit is accordingly established for energizing the lower winding b of the relay 82. This circuit extends from the positive terminal of the battery 64 by way of the positive battery wire 65, one or the other of the contacts b of the repeater relays 55f or 55r depending upon which is picked-up, the wire 72, resistor 93, wire 92, lower winding b of the relay 82, wire 94, contact e of the relay 83, negative battery wire 96, pressure switch 44c, and wire 68 to the negative terminal of the battery 64.

It will thus be seen that whenever the pressure switch 44c is closed, as it is normally whenever an application of the brakes is initiated, and assuming that one or the other of directional-repeater relays 55f or 55r is picked-up indicating that the vehicle is traveling in excess of a speed requisite thereto, the contacts of the relay 82 are accordingly actuated to the picked-up position thereof.

The contact member c of the relay 82 is effective in its picked-up or closed position to establish the previously mentioned shunt connection around the portion of the resistor 81a associated with the winding a of the speed relay 52L. This shunt circuit includes a back contact d of speed relay 52M so that the pick-up of relay 82 cannot establish the shunt connection around the portion of resistor 81a unless speed relay 52M is dropped-out. The reason for this will be explained hereinafter. The contact f of the relay 82 is effective in its dropped-out position to establish a shunt connection around a portion of the resistor 81c associated with the winding a of the speed relay 52H and, upon the actuation of the contact f to its picked-up or open position, this shunt connection is removed or opened.

The contact d of the relay 82 is effective when actuated to its picked-up or closed position to establish a circuit from the wire 72 for effecting energization of the magnet winding of the magnet valve 31L of the speed-controlled valve mechanism 27. This circuit includes the back contact g of the relay 83 so that if the contact g of relay 83 is in its picked-up or open position, the actuation of the contact d of relay 82 to its picked-up or closed position is ineffective to establish the energizing circuit for the magnet winding of magnet valve 31L.

The contact e of the relay 82 functions in cooperative serial relation with the contact c of the relay 83 to establish a circuit for energizing the magnet winding of the magnet valve 31H of the speed-controlled valve mechanism 27. The contact c of the relay 83 functions, in and of itself, to control a circuit for energizing the magnet winding of the magnet valve 31M of the speed-controlled valve mechanism 27.

The contact d of the relay 83 is effective, in its dropped-out or closed position, to establish a shunt connection around a portion of the resistor 81b associated with the winding b of the speed relay 52M and, when actuated to its picked-up or open position, removes or opens this shunt connection.

The single front contact of the speed relay 52L is interposed in a wire 98 one end of which is connected to the wire 92 at a point between the resistor 93 and the lower winding b of the relay 82 and the other end of which is connected to the stationary contact associated with the contact f of the relay 83. Thus, when the speed relay 52L is picked-up, the contact thereof establishes a short-circuit connection around the lower winding b of the relay 82, thereby causing the contacts of the relay 82 to drop-out. The resistor 93 is effective, while the winding b of relay 82 is short-circuited, to prevent short-circuiting of the battery 64.

Due to the dying away of the magnetic flux in the core of the relay 82 as a result of the shunting of the lower winding b thereof, a momentary voltage is induced in the upper winding a of the relay 82 which causes a current to flow in the previously described circuit including the winding b of the speed relay 52L in a direction to assist the upper winding a to effect the actuation of the contact of the speed relay 52L to its closed position. Positive operation of the contact of the speed relay 52L is accordingly effected and a fluttering or hesitant operation thereof prevented.

When front contact c of the speed relay 52M is actuated to its picked-up or closed position, it establishes a circuit for energizing the lower winding b of the relay 83, thereby causing the contacts of this relay to be actuated to their picked-up position. The circuit for energizing the lower winding b of relay 83 extends from the positive battery wire 65 by way of a branch wire 101, the front contact c of the speed relay 52M, lower winding b of the relay 83 and a resistor 102 to the negative battery wire 96. Resistor 102 is provided for limiting the current energizing the winding b of the relay 83 to its proper value.

The upper winding a of auxiliary relay 83 is constantly connected in a loop circuit with the winding b of speed relay 52M. When the circuit for energizing the lower winding b of the relay 83 is established, the build-up of magnetic flux in the core of the relay causes a momentary voltage to be induced in the upper winding a and a current accordingly flows through the lower winding b of the speed relay 52M in a direction to assist the winding a thereof to effect the closure of the contact of the relay 52M without fluttering or hesitation.

The contact d of the relay 83 is effective when actuated to its picked-up position to open the shunt connection around a portion of the resistor 81b associated with winding a of the speed relay 52M. Thus, whenever the speed relay 52M is picked-up, additional resistance is cut into the circuit of the upper winding a thereof for the reason previously stated.

When the contact h of the relay 83 is actuated to its picked-up or open position, it disconnects the winding b of speed relay 52L from the upper winding a of relay 82 and connects the winding b of speed relay 52H thereto, as previously described.

The contact f of relay 83 is effective, when actuated to its picked-up or open position, to remove the shunt connection around the lower winding b of the relay 82. Accordingly, when the single front contact of the speed relay 52H is actuated to its picked-up or closed position, it establishes a circuit for energizing the lower winding b of the relay 82. The contact f of the relay 82 is accordingly actuated to its picked-up or open position to open the shunt connection around a portion of the resistor 81c associated with the winding a of the speed relay 52H for the reason previously stated. The build-up of the magnetic flux in the core of the relay 82 in response to the energization of the lower winding b induces a momentary voltage in the upper winding a of the relay 82 which is effective by way of the circuit previously traced including transfer contact h of the relay 83 to cause current to flow through the lower winding b of the speed relay 52H in a direction to assist the upper winding a to effect the positive actuation of the front contact thereof to a closed position without hesitation.

The above description of the cooperative relation of the speed relays 52L, 52M, and 52H and the relays 82 and 83 is deemed sufficient for present purposes for the reason that further details of the operation will be brought out more clearly in connection with an assumed operation of the equipment.

Referring now to the slip relays 53a, 53b, 53c, and 53d, these relays are adapted to be responsive to the rate of change of voltage across the brush terminals 49 and 50 of the corresponding generators 48 by interposing in series relation with the upper winding a thereof across the brush terminals 49 and 50 of the corresponding generator a condenser 105 of suitable capacity. It will accordingly be seen that when the voltage at the brush terminals of one of the generators 48 increases, due to an increase in speed of the vehicle or the rotative acceleration of a slipping wheel unit back toward a speed corresponding to car speed, current flows in the circuit in one direction through the upper winding a of the corresponding slip relay to charge the corresponding condenser 105, the current varying in degree according to the rate of increase of generator voltage. It will be apparent that the higher the rate of increase of voltage across the brush terminals of a generator 48, the greater is the instantaneous difference between the voltage to which the condenser 105 is charged and the voltage across the brush terminals of the generator. Consequently, the charging current in the circuit will be substantially proportional to the rate of acceleration of the corresponding wheel unit.

Conversely, when the wheels of a wheel unit decelerate, the voltage across the brush terminals of the corresponding generator 48 decreases at a corresponding rate. The greater the rate of rotative deceleration of the vehicle wheels, the greater is the instantaneous difference between the voltage to which the condenser 105 is charged and the voltage across the brush terminals of the generator. Accordingly, the current discharged in the circuit from the condenser in a reverse direction to the charging current is substantially proportional to the rate of deceleration of the vehicle wheels.

It should be understood that this type of electrical apparatus for recognizing or measuring the rate of acceleration or deceleration of a rotating element is not, in itself, my invention.

The upper winding a of each of the slip relays 53a, 53b, 53c, and 53d is so connected in the circuit across the brush terminals of the corresponding generator 48 that the relay is picked-up only in response to a condenser discharge current and is not picked-up in response to a condenser charging current. Furthermore, the winding a of each of the slip relays is so designed that unless the current discharged from the condenser in the corresponding circuit exceeds a certain value corresponding to a rate of rotative deceleration of the wheels of the corresponding wheel unit which occurs only when the wheels slip, for example ten miles per hour per second, the single front contact of the relay is not operated to its picked-up or closed position.

As previously stated, the slip relays 53a, 53b, 53c, and 53d are uni-directional relays similar to a polarized relay in that they are responsive or non-responsive depending upon the direction of flow of current through the operating winding thereof and similar to a neutral relay in that when the current in the proper direction to cause pick-up of the relay reduces below a certain value, the contact member of the relay is restored to its dropped-out position. In order, therefore, to prevent the drop-out of the contacts of the slip relays when the rate of rotative deceleration of the corresponding wheel unit decreases below a slipping rate, the windings b of the relays are utilized as holding windings. As will be explained more fully hereinafter, the holding winding b of only two of the slip relays, namely, relays 53b and 53d, are utilized.

The circuit for the holding winding b of the relay 53b is established whenever the contact of either of the relays 53a and 53b is actuated to its picked-up or closed position. This holding circuit, as will be explained hereinafter, includes the pressure switch 44f associated with the brake cylinders of the corresponding wheel truck 11 and the magnet winding 43 of the magnet valve section 42 of the slip-controlled valve device 36 of the corresponding truck. In a similar manner, the holding circuit for winding b of relay 53d, including magnet winding 43 of slip-controlled valve device 36 for wheel truck 12 and pressure switch 44r, is established by actuation of the contact of either of the relays 53c or 53d to its picked-up position. It will thus be seen that once the holding circuit for the holding winding b of one of the slip relays is established, it is maintained until the fluid pressure in the brake cylinders 15 of the corresponding wheel truck is reduced by operation of the corresponding slip-controlled valve device 36 sufficiently to open the corresponding pressure switch 44f or 44r.

OPERATION OF EQUIPMENT (a) *Conditioning of equipment*

Let it be assumed that the main reservoir 18 is charged to the normal pressure carried therein, and that the car having the equipment shown in Figs. 1 and 2 is at a standstill with the brake valve handle 17a in its brake release position establishing atmospheric pressure in the control pipe 16 preparatory to applying propulsion power to the propulsion means of the vehicle. Since the car is stationary, the generators 48 associated with the wheel units are not producing any voltage and consequently the directional relays 54f and 54r are dropped-out. Since the contact c of both directional relays 54f and 54r is in open position, the circuit previously traced for energizing the indicating lamp 61 is interrupted and consequently the lamp is dark. At the same time, due to the fact that atmospheric pressure is established in the control pipe 16, the pressure switch 44c is in open position thereby interrupting the connection between the negative battery wire 96 and the negative terminal of the battery 64 and preventing possible drainage of current from the battery while the car is standing still or out of service. The pressure switches 44f and 44r associated with the brake cylinders 15 are likewise in open position because fluid under pressure is released from the brake cylinders.

Since the directional relays 54f and 54r are both dropped-out, the directional repeater relays 55f and 55r are correspondingly both dropped-out. Accordingly, the bus wires 79 and 80 on which the speed relays 52L, 52M, and 52H operate are disconnected from the corresponding generator 48 as are also the windings a of all of the slip relays 53a, 53b, 53c and 53d.

Now let it be further assumed that the operator of the car operates a suitable propulsion controller (not shown) supplying power to the propulsion means (not shown) of the vehicle and that the car begins to accelerate in a forward direction.

When the speed of the car exceeds a relatively low speed, such as eight miles per hour, the directional relay 54f is picked-up. The indicating lamp 61 is thus immediately illuminated due to the completion of the energizing circuit therefor by the closure of the contact c of the directional relay 54f.

The closure of the contact d of the directional relay 54f is ineffective to cause energization of the winding of the repeater relay 55f because of the fact that the pressure switch 44c is in open position and prevents the completion of the energizing circuit for the winding of the relay 55f. This will be made clear hereinafter when the circuit for energizing the winding of the relay 55f is described.

The fact that the directional relay 54f is picked-up however indicates that the generator 48 is producing voltage in a proper manner as indicated by the illumination of the indicating lamp 61.

It will be apparent, therefore, that while the vehicle is traveling under power with the brakes released, the windings a of the relays 52L, 52M, 52H as well as the windings a of the slip relays 53a, 53b, 53c, and 53d do not constitute any load on the corresponding generators 48 because the circuit connections thereto are interrupted by the reversing contacts of the directional repeater relays 55f and 55r.

(b) *Application of brakes: speed-control operation*

Let it now be assumed that the car has been accelerated to and is traveling at a speed such as eighty miles per hour and that the operator desires to bring the car to a stop. To do so, the operator first shuts off the propulsion power and then shifts the brake valve handle 17a into the application zone an amount corresponding to the desired degree of application of the brakes. The control pipe 16 is accordingly charged with fluid at a pressure corresponding to the position of the brake valve handle in the application zone such as, for example, fifty pounds per square inch.

The speed-controlled valve mechanism 27 is accordingly operated to supply fluid from the supply pipe 19 and branch pipe 19a to the pipe 35 at a pressure depending upon the combination of magnet valves 31H, 31M, and 31L in effect at the particular speed, as will be explained presently. The fluid under pressure supplied to the slip-controlled valve devices 36 causes operation thereof to supply fluid under pressure from the supply pipe 19 and branch pipe 19a to the associated brake cylinders 15 to effect application of the brakes associated with the wheels 13 of both wheel trucks 11 and 12.

When the pressure in the control pipe 16 exceeds the pressure requisite thereto, namely five pounds per square inch, the pressure switch 44c is operated to closed position and establishes a circuit for energizing the winding of the repeater relay 55f. This circuit extends from the positive terminal of the battery 64 by way of the positive battery wire 65, a branch wire 111 including the resistor 71, back contact e of the directional relay 54r, a wire 112, winding of relay 55f, a wire 113, front contact d of the directional relay 54f, wires 114 and 115, negative battery wire 96, closed pressure switch 44c, and wire 68 back to the negative terminal of the battery 64.

The contact a of the relay 55f is effective in its picked-up or closed position to establish a circuit for maintaining the winding of the relay 55f energized independently of the contact d of the directional relay 54f. It will be apparent that this is the case because the contact a of the relay 55f is connected in parallel with the contact d of the directional relay 54f.

The contact b of repeater relay 55f is effective in its picked-up or closed position to complete a circuit, previously traced, for energizing the lower winding b of the relay 82. The contact c of relay 82 is accordingly actuated to its picked-up or closed position. With speed relay 52M dropped-out and its back contact d closed, the closure of contact c of relay 82 effects the short-circuiting of a portion of the resistor 81a in series with the upper winding of the speed relay 52L.

The contacts c and d of the repeater relay 55f are effective when actuated to the picked-up positions thereof to establish the connections between the bus wires 79 and 80 and the brush terminals 49 and 50 of the generator 48 on which the directional relays 54f and 54r operate. With the brush terminals 49 and 50 of the generators 48 respectively of positive and negative polarity, as previously assumed for the forward travel of the car, the bus wires 79 and 80 are connected respectively to the brush terminals 49 and 50 and are thus respectively of positive and negative polarity. Since the generators are already producing a voltage at the brush terminals corresponding to the speed of the car, the voltage across the bus wires 79 and 80 accordingly builds-up to a corresponding value. The speed relays 52L, 52M, and 52H are thus sequentially picked-up as the voltage across the bus wires 79 and 80 builds-up because flow of current through winding a of these relays from wire 79 to wire 80 is in the proper direction to pick-up the relays.

As previously indicated, when the speed relay 52L is picked-up the contact thereof establishes a short-circuit by way of the contact f of the relay 83 around the lower winding b of the relay 82 and relay 82, therefore, drops-out. At the same time, the momentary voltage induced in the upper winding a of the relay 82 assists the winding a of speed relay 52L to positively close its contact. Contact c of relay 82 is effective when thus restored to its dropped-out or open position to remove the shunt connection around the portion of resistor 81a, thus inserting this additional resistance in the circuit of winding a of speed relay 52L.

When the speed relay 52M is picked-up, the front contact c thereof establishes the circuit, previously traced, for energizing the lower winding b of the relay 83 and the contacts of relay 83 are accordingly actuated to their picked-up positions. As previously explained, the voltage momentarily induced in the upper winding a of the relay 83 due to energization of winding b energizes the winding b of the speed relay 52M to assist the winding a thereof to effect positive closure of its contact. Back contact d of speed relay 52M is effective in its picked-up or open position to prevent the establishment of the shunt connection around a portion of resistor 81a when relay 82 is subsequently picked-up as presently described.

The back contact f of relay 83 is effective when actuated to its picked-up or open position to interrupt the short-circuit connection around the lower winding b of relay 82, but due to the fact that the back contact e of relay 83 is also actuated at the same time to its picked-up or open position, the circuit for energizing the lower winding b of relay 82 is interrupted. Thus, when pick-up of speed relay 52M is effected, the relay 82 remains dropped-out.

When the single front contact of the speed relay 52H is actuated to its picked-up or closed position, it reenergizes the lower winding b of the relay 82 because of the fact that the short-circuit around this winding was previously opened due to opening of the back contact f of the relay 83 in response to pick-up thereof.

Contact c of relay 82 is not effective at this time when actuated to its picked-up or closed position to shunt the portion of resistor 81a because back contact d of speed relay 52M is in open position, and prevents it from doing so. It is possible to omit contact d of speed relay 52M from the shunt circuit around a portion of resistor 81a but it is preferable to include this contact d of speed relay 52M in order to prevent the possible undesired fluttering of the contact of speed relay 52H. If contact c of relay 82 were permitted to establish the shunt connection around the portion of resistor 81a in response to pick-up of speed relay 52H, the increased load on the generator 48 controlling the speed relays might cause sufficient drop in the terminal voltage thereof that speed relay 52H would drop-out immediately after being picked-up. This would in turn cause relay 82 to drop-out. Speed relay 52H would thus instantly pick-up again and the fluttering operation would continue until the terminal voltage of the generator increased sufficiently to maintain the speed relay 52H picked-up notwithstanding the shunting of the portion of resistor 81a.

The contact d of the relay 82 is non-effective in its picked-up or closed position to produce any result at this time because of the back contact g of the relay 83 being simultaneously in its open position.

Contact c of the relay 83 is effective in its picked-up or closed position to establish a circuit for energizing the magnet winding of the magnet valve 31M of the speed-controlled valve mechanism 27. This circuit extends from the positive terminal of the battery 64 by way of the positive battery wire 65, a branch wire 121, contact c of the relay 83, a wire 122, magnet winding of the magnet valve 31M, a wire 123, negative battery wire 96, closed pressure switch 44c, and wire 68 back to the negative terminal of the battery 64.

Contact e of relay 82 is effective in its closed or picked-up position jointly with the contact c of the relay 83 in its picked-up or closed position to establish a circuit for energizing the magnet winding of the magnet valve 31H of the speed-controlled valve mechanism 27. This circuit extends from the positive terminal of the battery 64 by way of the positive battery wire 65, branch wire 121, contact c of relay 83, wire 122, contact e of relay 82, a wire 125, magnet winding of the magnet valve 31H, a wire 126, negative battery wire 96, closed pressure switch 44c, and wire 68 back to the negative terminal of the battery 64.

It will thus be seen that with the car traveling at a speed of eighty miles per hour, which is typical of the operation at speeds in excess of seventy miles per hour, the magnet windings of the magnet valves 31H and 31M are energized whereas the magnet winding of the magnet valve 31L is deenergized. As previously explained, the speed-controlled valve mechanism 27 is therefore effective to supply fluid to the pipe 35 at a pressure equal to the pressure established in the control pipe 16. The slip-controlled valve devices 36 are accordingly effective to cause fluid to be supplied to the brake cylinders 15 of the corresponding wheel trucks at a pressure corresponding to the pressure supplied into the pipe 35. If, therefore, a pressure of fifty pounds per square inch is established in the control pipe 16 as previously assumed, it will be seen that an equivalent pressure is established in the brake cylinders 15.

When the speed of the vehicle reduces slightly below seventy miles per hour, corresponding to the critical pick-up point of the speed relay 52H, the contact of the relay 52H is restored to its open position interrupting the circuit for energizing the lower winding b of the relay 82. The contacts of relay 82 are accordingly restored to their dropped-out position.

Due to the dying-away of flux in the magnetic core of relay 82 upon the deenergization of winding b thereof, a voltage is momentarily induced in winding a of relay 82 which causes flow of current through the winding b of speed relay 52H in a direction to oppose the effect of the current in the winding a of relay 52H, thus causing the contact of speed relay 52H to be positively restored to its open position without fluttering or hesitation.

As previously indicated, the contact f of the relay 82 is effective in its dropped-out position to shunt a portion of the resistor 81c in the circuit of the winding a of the speed relay 52H. The restoration of contact c of the relay 82 to its dropped-out or open position is without effect at this time because the shunt connection around a portion of the resistor 81a in the circuit of the winding a of the speed relay 52L is already open at back contact d of speed relay 52M. The restoration of the contact d of the relay 82 to its open position is obviously without effect at this time.

The contact e of the relay 82 is effective when restored to its dropped-out or open position to interrupt the circuit, previously traced, for energizing the magnet winding of the magnet valve 31H of the speed-controlled valve mechanism 27. As previously explained, the valve mechanism 27 is accordingly conditioned by virtue of the fact that only the magnet winding of the magnet valve 31M remains energized, to effect a reduction of the pressure in the pipe 35 at a controlled rate to a value which is eighty percent of the pressure established in the control pipe 16.

The slip-controlled valve devices 36 accordingly operate in response to the reduction of the pressure in the pipe 35 to effect a corresponding reduction of the pressure in the brake cylinders 15 at the same rate. Assuming a pressure of fifty pounds per square inch to be maintained in the control pipe 16, it will be seen, therefore, that when the speed of the vehicle reduces below seventy miles per hour, the pressure in the brake cylinders 15 is automatically reduced to eighty percent of fifty pounds per square inch or forty pounds per square inch. Thus, without any act of the operator, the degree of application of the brakes associated with the wheels of the vehicle is reduced in proportion to the reduction in the degree of fluid pressure supplied to the brake cylinders.

In the case of a train of cars of the non-articulated type, no undesired slack action can result due to reduction of the degree of application of the brakes by speed-controlled valve mechanism 27 because the rate of reduction is controlled.

When the speed of the car reduces in response to the continued application of the brakes to a speed slightly below forty miles per hour, corresponding to the critical pick-up point of the speed relay 52M, the contacts of the relay 52M are restored to their dropped-out positions. Contact c of relay 52M accordingly interrupts the energizing circuit for the lower winding b of the relay 83 which correspondingly drops-out. Due to the dying-away of the magnetic flux in the core associated with the windings of the relay 83, a voltage is induced momentarily in the upper winding a thereof which causes a flow of current in the winding b of the speed relay 52M in a direction opposing the effect of the current in winding a of the relay 52M, thereby causing the contacts of the relay 52M to be positively operated to their dropped-out positions without fluttering. The restoration of contact d of speed relay 52M to its dropped-out or closed position is without effect at this time because contact c of relay 82 is in its open position and thereby prevents the establishment of the shunt connection around a portion of resistor 81a due to drop-out of speed relay 52M.

As previously indicated, the restoration of the contact d of the relay 83 to its dropped-out or closed position following deenergization of winding b thereof restores the shunt connection around a portion of the resistor 81b in the circuit of the winding a of the speed relay 52M. Transfer contact h of the relay 83 is effective in its dropped-out position to reconnect the upper winding a of relay 82 in series relation with winding b of speed relay 52L.

Back contact e of relay 83 is effective in its dropped-out or closed position to establish a circuit tending to energize the lower winding b of the relay 82 but the back contact f of relay 83 is effective in its dropped-out or closed position in cooperation with the still-closed contact of the speed relay 52L to, at the same time, shunt the winding b of the relay 82 and prevent its energization. Thus, when the speed relay 52M is dropped-out, the relay 82 remains dropped-out.

Contact c of relay 83 is effective when restored to its dropped-out or open position to interrupt the circuit for energizing the winding of the magnet valve 31M of the speed-controlled valve mechanism 27. At the same time, since the contact d of relay 82 is in its dropped-out or open position, the restoration of the contact g of relay 83 to its dropped-out or closed position is without effect.

It will thus be seen that when the speed relay 52M is dropped-out, the auxiliary relays 82 and 83 are positioned so as to effect deenergization of the magnet windings of all of the magnet valves 31H, 31M and 31L of the speed-controlled valve mechanism 27. As previously explained, the valve mechanism 27 is accordingly effective to reduce at a controlled rate the pressure supplied thereby to the pipe 35 to a value which is sixty percent of the pressure established in the control pipe 16. The slip-controlled valve devices 36 associated with both wheel trucks accordingly operate to correspondingly reduce the pressure of the associated brake cylinder 15. Assuming a pressure of fifty pounds per square inch to remain in the control pipe, it will be seen that when the speed of the vehicle reduces below forty miles per hour in response to the application of the brakes, the speed-controlled valve mechanism effects a reduction of the pressure in the brake cylinders 15 at a controlled rate to a value which is sixty percent of fifty pounds per square inch or thirty pounds per square inch.

When the speed of a car reduces below twenty miles per hour, the contact member of the speed relay 52L drops-out to its open position, thereby interrupting the shunt connection including back contact f of relay 83 around the lower winding b of the relay 82. Accordingly, due to the fact that the back contact e of relay 83 establishes a circuit for energizing the winding b of relay 82 at this time, the winding b of relay 82 is energized and the contacts of relay 82 are accordingly actuated to their picked-up positions.

The momentary voltage induced in the upper winding a of the relay 82, as a result of the build-up of flux in the magnetic core associated with the windings of the relay is in such a direction that the current flowing through the winding b of the speed relay 52L opposes the effect of the current in the winding a of the relay 52L and thus causes the contact of the relay 52L to be positively actuated to its open position without fluttering.

The contact c of the relay 82 is effective at this time when actuated to its picked-up or closed position to shunt a portion of the resistor 81a associated with the winding a of the speed relay 52L because back contact d of speed relay 52M is in its closed position. The relay 52L is thus properly conditioned for a subsequent pick-up at the proper speed.

Contact d of the relay 82 is effective, when actuated to its closed position, to establish the circuit for energizing the magnet winding of the magnet valve 31L of the speed-controlled valve mechanism 27. This circuit extends from the positive terminal of the battery 64 by way of the positive battery wire 65, contact b of the directional repeater relay 55f, wire 72, contact d of the relay 82, wire 131, back contact g of the relay 83, wire 132, magnet winding of the magnet valve 31L of the speed-controlled valve mechanism 27, wire 133, negative battery wire 96, closed pressure switch 44c, and wire 68 back to the negative terminal of the battery 64.

Due to the front contact c of relay 83 being in its dropped-out or open position at this time, the actuation of the contact e of relay 82 to its picked-up or closed position is ineffective to cause energization of the magnet winding of the magnet valve 31H of the valve mechanism 27. The magnet valve 31M also remains energized due to the open position of the contact c of the relay 83.

It will thus be seen that, when the speed of the car reduces below twenty miles per hour, the speed relay 52L drops-out and thereby operates through the auxiliary relays 82 and 83 to cause energization of the magnet winding of only the magnet valve 31L of the valve mechanism 27. As previously indicated, the valve mechanism 27 accordingly operates to further reduce the pressure of the fluid supplied to the pipe 35 at a controlled rate to establish a pressure therein which is only forty per cent of the pressure established and maintained in the control pipe 16. Assuming that a pressure of fifty pounds per square inch is maintained in the control pipe 16, the reduction in the speed of the car below twenty miles per hour is effective to cause reduction of the pressure supplied by the valve mechanism 27 to the pipe 35 to forty percent of fifty pounds per square inch or twenty pounds per square inch. The slip-controlled valve devices 36 for both wheel trucks 11 and 12 accordingly operate in response to the reduction of the pressure in the pipe 35 in the manner just described to correspondingly reduce the pressure in the brake cylinders to twenty pounds per square inch, thereby again further decreasing the degree of application of the brakes.

No further change in the condition of the speed-controlled valve mechanism 27 occurs as the car reduces toward zero speed or stopped position and accordingly the pressure which remains established in the brake cylinders as the speed of the vehicle reduces from twenty miles per hour to zero speed will remain forty per cent of that established in the control pipe 16. It will be apparent that such is the case because, although the directional relay 54f (or 54r) drops out when the speed of the car or train reduces somewhat below eight miles per hour, the corresponding repeater relay 55f (or 55r) remains "stuck-up" due to the holding circuit therefor established by its own front contact a as previously described. Thus, lower winding b of relay 82 remains energized during the time that the car reduces from a speed of twenty miles per hour to zero speed and does not become deenergized until such time as the brakes are released by the operator and the pressure switch 44c correspondingly opened, as hereinafter described, to interrupt the holding circuit for the repeater relay 55f (or 55r).

If desired, the operator of the vehicle may operate the brake valve handle 17a to reduce the pressure in the control pipe 16 as the vehicle reduces in speed, although the automatic reduction of the pressure in the brake cylinders by operation of the speed-controlled valve mechanism 27 is intended to make this unnecessary. Obviously, however, if the operator does vary the pressure in the control pipe 16 during an application of the brakes while the vehicle is reducing in speed, the degree of application of the brakes will vary correspondingly although the ratio between the pressure established in the brake cylinders and that in the control pipe will remain unchanged for a given speed range as determined by the speed relays 52L, 52M and 52H.

After the car comes to a complete stop, the operator may increase the pressure in the control pipe 16 to a maximum pressure to correspondingly increase the degree of application of the brakes and thereby provide adequate braking to hold the vehicle at a standstill on any grade occurring under service conditions. Obviously, the increase in the degree of application of the brakes after the vehicle has come to a stop in no way operates to cause sliding of the wheels so that such increase in the degree of application of the brakes may be made safely.

It was assumed above that the application of the brakes was initiated at a time that the car was traveling at a speed of eighty miles per hour. Obviously, if the application of the brakes is initiated while the car is traveling at any speed between forty and seventy miles per hour, such as sixty miles per hour, only the speed relays 52L and 52M would be picked-up and the speed relay 52H would remain dropped-out. Accordingly, the speed-controlled valve mechanism 27 will, in such case, be initially conditioned to cause energization of only the magnet winding of the magnet valve 31M. Thus, the pressure initially established in the pipe 35 and correspondingly in the brake cylinders 15 will be eighty percent of that established in the control pipe 16. Thereafter, as the car speed reduces successively below forty and twenty miles per hour, the speed-controlled valve mechanism 27 is successively conditioned to reduce the pressure in the brake cylinders to sixty and forty percent of that in the control pipe 16.

If the application of the brakes is initiated when the car is traveling at any speed between twenty and forty miles per hour, such as thirty miles per hour, only the speed relay 52L will be picked-up and consequently the valve mechanism 27 will be conditioned in response to the deenergization of the magnet windings of all of the magnet valves thereof to produce a pressure in the pipe 35, and correspondingly in the brake cylinders 15, which is sixty percent of that established in the control pipe 16. Thereafter as the speed of the car reduces below twenty miles per hour, the speed-controlled valve mechanism is conditioned to reduce the pressure in the brake cylinders to forty percent of that in the control pipe 16.

If the application of the brakes is initiated while the car is traveling at a speed below twenty miles per hour and in excess of eight miles per hour, all of the speed relays 52H, 52M, and 52L will be dropped-out and the valve mechanism 27 will be correspondingly conditioned by the energization of the magnet winding of only the magnet valve 31L to establish a pressure in the pipe 35 and in the brake cylinders 15 which is forty per cent of that established in the control pipe 16. The pressure in the brake cylinders may be varied thereafter by operation of the brake valve 17 but the percentage of the pressure in the brake cylinders relative to the pressure in the control pipe will be maintained thereafter until the car is completely stopped and then also as long as the brakes remain applied, as previously explained.

If the car is traveling less than eight miles per hour, or if the generator 48 supplying voltage to the bus wires 79 and 80 fails to deliver voltage thereto at any speed while the brakes are released, the arrangement of the directional relays 54f and 54r and the repeater relays 55f and 55r which I have provided is automatically effective, in response to initiation of a brake application, to cause the speed-controlled valve mechanism 27 to be conditioned to cause the fluid pressure established in the brake cylinders to be sixty per cent of the pressure established in the control pipe. Failure of the speed-control generator 48 to supply voltage to the bus wires 79 and 80 may be caused by a short-circuited or a "burntout" armature winding.

It will be apparent that if the one or the other of the directional relays 54f and 54r are not picked-up for whatever reason, the corresponding repeater relays 55f and 55r cannot be picked-up. If both of the repeater relays 55f and 55r are dropped-out, then the connection between the positive battery wire 65 and the wire 72 is interrupted due to the contact b of both repeater relays being in dropped-out or open position. Accordingly, even though the back contact e of relay 83 is in its dropped-out or closed position, the lower winding b of relay 82 cannot be energized and the relay contacts correspondingly actuated to their picked-up position. With the front contacts d and e of the relay 82 in their respective dropped-out or open positions, therefore, the circuits for energizing the magnet windings of the magnet valves 31L and 31H of the valve mechanism 27 are both interrupted. At the same time, relay 83 is dropped-out because the speed relay 52M is dropped-out, and consequently the front contact c of relay 83 is effective in its dropped-out or open position to prevent the energization of the magnet winding of the magnet valve 31M and also of the magnet valve 31H of the valve mechanism 27.

It will thus be seen that when an application of the brakes is initiated at a time that the car is traveling at a speed less than eight miles per hour, or at any speed while the speed-control generator 48 fails to supply voltage, valve mechanism 27 will be conditioned automatically to cause the pressure of the fluid supplied to the brake cylinders to be sixty per cent of that established in the control pipe 16.

Ordinarily, the operator of the car or train will make only a light application of the brakes if the car is traveling at a speed less than eight miles per hour and thus the fact that brake cylinder pressure is sixty per cent of the pressure in the control pipe will not cause an unduly severe degree of application of the brakes so as to produce possible sliding of the wheels. There is, moreover, a distinct advantage in having the pressure in the brake cylinders be sixty per cent of that in the control pipe in the event that the speed-control generator 48 fails to deliver voltage for the reason that it is intended that, assuming a maximum pressure to be established in the control pipe 16, a pressure in the brake cylinders which is sixty percent of such pressure will effect a brake application which will be equivalent to a normal braking ratio of one hundred and fifty percent. The term "braking ratio" as used in this instance refers, in the customary manner, to the ratio between the number of pounds exerted on all the brake shoes by the brake cylinders in relation to the weight of the car. Since a braking ratio of one hundred and fifty percent is considered adequate to bring a vehicle to a stop in a reasonably safe stopping distance, it will be seen that even if the automatic speed-controlled equipment fails to function in its intended manner, an adequate and safe degree of application of the brakes may nevertheless be obtained automatically upon initiation of an application of the brakes.

If the speed-control generator 48 supplying voltage to the speed relay bus wires 79 and 80 fails to supply voltage after an application of the brakes has been initiated and while the car or train is being brought to a stop, the valve mechanism 27 is automatically conditioned to cause the pressure established in the brake cylinder to be forty per cent of that established in the control pipe 16. This is so because, in such case, the repeater relay 55f (or 55r) has been previously picked-up and remains "stuck-up" as previously described so that the relay 82 remains picked-up while the relay 83 is dropped-out. Thus, the circuit previously described including the front contact d of relay 82 and the back contact g of relay 83 for energizing the magnet winding of the magnet valve 31L of valve mechanism 27 will be established and the valve mechanism 27 thereby conditioned to cause a pressure to be established in the brake cylinders which is forty per cent of that in the control pipe. Even in such case, the braking effect which may be produced is entirely adequate to stop the car or train although the stopping distance may be lengthened somewhat with respect to the usual stopping distance.

(c) *Application of brakes: anti-wheel-sliding operation*

In the foregoing description of the operation of the equipment, it was assumed that slipping of the wheels of the car did not occur upon application of the brakes. In the event that one or more wheels or wheel units of the car begin to slip during an application of the brakes, a further operation of the equipment occurs which will now be described.

Let it be assumed that during an application of the brakes, regardless of the particular speed range in which the car is traveling, the wheels of the trailing wheel unit of the truck 12 begin to slip. In such case, the contact of the slip relay 53d is actuated to its picked-up or closed position, thereby establishing a circuit for energizing the magnet winding 43 of the magnet valve section 42 of the slip-controlled valve device 36 corresponding to the rear wheel truck 12 which circuit at the same time constitutes a circuit for energizing the holding winding b of the slip relay

53d. This circuit extends from the positive terminal of the battery 64 by way of the positive battery wire 65, a branch wire 141, winding b of the slip relay 53d, a wire 142, contact of the relay 53d, a wire 143 including in series relation therein the closed pressure switch 44r and the magnet winding 43 of the slip-controlled valve device 36 for the rear wheel truck 12, negative battery wire 96, closed pressure switch 44c and wire 68 back to the negative terminal of the battery 64.

Upon the energization of its magnet winding 43, the magnet valve section 42 of the slip-controlled valve device 36 operates to close the communication through which fluid under pressure is supplied from the pipe 35 to the pressure chamber at one side of the operating piston of the relay valve section 41 and at the same time establish a communication through which fluid under pressure is rapidly exhausted from such pressure chamber. The relay valve section 41 accordingly operates to effect a rapid reduction of the pressure in the brake cylinders 15 associated with the wheels of the wheel truck 12.

The direction of flow of current through the holding winding b of the slip relay 53d is in a direction to maintain the contact of the relay in its closed position independently of variations of the current energizing the pick-up winding a thereof in response to subsequent variations in the rate of deceleration and acceleration of the slipping wheels. Accordingly, the circuit for energizing the magnet winding 43 of the slip-controlled valve device 36 remains established as long as the pressure switch 44r remains in its closed position, which it does until the fluid pressure in the brake cylinders 15 associated therewith is reduced by operation of the slip-controlled valve device 36 to a pressure below five pounds per square inch. At such time the circuit for energizing the magnet winding 43 of the slip-controlled valve device 36 is interrupted and the magnet valve section 42 restored to its normal position to interrupt the exhaust of fluid under pressure from the pressure chamber of the relay valve section 41 and reestablish the supply communication from the pipe 35 thereto.

Due to the rapid and prompt release of fluid under pressure from the brake cylinders 15 of the truck having the slipping wheels, the slipping wheels promptly cease to decelerate and begin to accelerate without having reduced in speed to a locked or non-rotative condition. The slipping wheels normally begin to accelerate back toward a speed corresponding to car speed, in response to the reduction of pressure in the brake cylinders, before the pressure switch 44r opens. If for some reason, such as sticking of the brake shoes to the wheels, the brakes are not promptly released in response to the operation of the slip relay 53d, the continued reduction of the pressure in the brake cylinders to below five pounds per square inch positively insures the ultimate release of the brakes and the consequent restoration of the slipping wheels to a speed corresponding to vehicle speed.

The time required for the pressure in the brake cylinders to be reduced below five pounds per square inch of course varies with the pressure established in the brake cylinder but, in any case, the time ordinarily elapsing between the initiation of the wheel-slip and the restoration of the slipping wheels to a speed corresponding to car speed will be less than the time required to reduce the pressure in the brake cylinders to below five pounds per square inch. It will thus be seen that since the opening of the pressure switch 44r and the consequent restoration of the slip-controlled valve device 36 to its normal position for re-supplying fluid under pressure to the brake cylinders 15 does not occur until after, or substantially at the time the slipping wheels are restored fully to the speed corresponding to car speed, the reapplication of the brakes on the slipping wheels will not be effected while the wheels are slipping. Thus the likelihood that the wheels will again slip due to reapplication of the brakes on the slipping wheel is minimized.

It will be apparent that due to the venting of the pressure chamber of the relay valve section 41 of the slip-controlled valve device 36 in response to the slipping of the wheels, the restoration of the slip-controlled valve device 36 to its normal condition to effect resupply of fluid under pressure thereto tends to effect a reduction of the pressure in the pipe 35. The speed-controlled valve mechanism 27, however, is operative through the relay valve section 28 thereof to maintain a pressure in the pipe 35 which is that percentage of the pressure in the control pipe 15 corresponding to the particular speed range in which the vehicle is traveling. The slip-controlled valve device 36 is, therefore, operated upon the opening of the pressure switch 44r to resupply fluid under pressure to the associated brake cylinders 15 at a pressure corresponding to the particular speed range in which the car is traveling.

If the slipping of the wheels was caused by a momentary bad rail condition, that is low adhesion condition of the rails, the restoration of the usual pressure to the brake cylinders for the particular speed range following slipping of the wheels will not cause repeated slipping of the wheels. If, however, the low adhesion condition of the rails continues so that upon restoration of fluid under pressure to the brake cylinders following wheel slip slipping of the wheels again occurs, the above operation is repeated. Thus at no time during an application of the brakes are the wheels permitted to decelerate to a locked or non-rotative condition and slide.

It will be seen that because the contact of the slip relay 53c is connected in parallel with the contact of the slip relay 53d, the slipping of the wheels of the leading wheel unit of the wheel truck 12 will result in operation of the slip-controlled valve device 36 for the rear wheel truck 12 in the same manner as just described. In this connection, it will be noted that the relay 53c does not have its winding b connected in the circuit for energizing the magnet winding 43 of the slip-controlled valve device 36 for the rear wheel truck 12. However, the winding b of the slip relay 53d is energized by closure of the contact of the slip relay 53c and the contact of the relay 53d is therefore actuated to its closed position. Thus, once the circuit for energizing the magnet winding 43 of the slip-controlled valve device 36 for the wheel truck 12 is established by the contact of the slip relay 53c, the subsequent drop-out of the relay 53c is immaterial because the circuit is thereafter maintained by the contact and self-holding winding b of the relay 53d.

It is possible to arrange the winding b of the relay 53c and its contact in series relation just as is the contact and winding b of the relay 53d so that the relay 53c may, independently of the relay 53d, maintain the circuit for energizing the magnet winding 43 of the slip-controlled valve device 36. However, in the event that the wheels associated with both the trailing and the leading wheel units of truck 12 slip at the same time, it is possible that due to the parallel arrangement of the windings b of the two relays 53c and 53d insufficient current would be supplied to energize these windings to maintain the contact members of the relays in their closed positions. The arrangement which I have provided whereby only one of the pair of slip relays for a given wheel truck has its holding winding b arranged in the circuit for energizing the magnet winding 43 of the slip-control valve device 36 insures adequate current to maintain the contact member of at least one of the relays in its closed position until the circuit is interrupted by opening of the pressure switch 44r.

If the wheels associated with either the trailing or the leading wheel units of the wheel truck 11 begin to slip during an application of the brakes, one or the other or both of the slip relays 53a and 53b are picked-up and the contacts thereof accordingly actuated to their picked-up or closed positions to establish a circuit for energizing the magnet winding 43 of the magnet valve section 42 of the slip-controlled valve device 36 corresponding to the wheel truck 11 subject to the opening of the pressure switch 44f associated with the brake cylinders of that truck. The circuit for energizing the magnet winding 43 of the slip-controlled valve devices 36 associated with the wheel truck 11 is sufficiently obvious in view of the previously described circuit for the magnet winding 43 of slip-controlled valve device 36 for the wheel truck 12 as to obviate the need for specific description thereof. It will be noted that only the winding b of the slip relay 53b is employed as a holding winding in the circuit of the magnet winding 43 of the slip-controlled device 36 for the wheel truck 11, for the same reason previously given in connection with the relays 53c and 53d.

*(d) Adaptability of equipment for travel of car in either forward or reverse direction*

In the previously described operation, it was assumed that the vehicle was traveling in a forward direction so that the directional relay 54f and correspondingly the repeater relay 55f were picked-up while the directional relay 54r and repeater relay 55r were dropped-out. If the car is connected in a train in such a manner that the wheels rotate in the opposite direction to that for the forward travel of the car, which situation is herein referred to as reverse travel of the car, the equipment will operate in exactly the same manner as previously described. It will be apparent that such is the case because the directional relay 54r and correspondingly the repeater relay 55r will be picked-up while the directional relay 54f and the repeater relay 55f will be dropped-out. Thus, the connections of the speed relays 52L, 52M, and 52H as well as those of the slip relays 53a, 53b, 53c, and 53d will be reversed so that, although the polarity of the brush terminals 49 and 50 of the generators 48 is reversed, that is although they are now of negative and positive polarity, respectively, the bus wires 79 and 80 will nevertheless be of positive and negative polarity as for forward travel and the direction of flow of current through the windings a of the speed relays will be in the same direction and, in the case of the slip relays, the direction of flow of condenser charging and discharging current through the windings a of the slip relays will be the same as for forward travel. Thus the slip relays will respond only to the rotative deceleration of the corresponding wheels or wheel units at a slipping rate.

While it has previously been proposed to provide automatic apparatus for automatically reversing the connections of wheel-slip relays of electrical wheel-slip responsive apparatus of the type shown, the arrangement which I have provided including two directional relays and two directional-repeater relays arranged in interlocked and coordinated relation insures against the possibility of undesired reversed connections for a particular direction of travel. This may be demonstrated by assuming that the directional relay 54f fails to drop-out upon a reversal of polarity of the brush terminals 49 and 50 of the associated generator 48. It will be seen that, in such case, the circuit for energizing the winding 55r of the directional repeater relay 55r cannot be established due to the fact that the back contact e of the directional relay 54f is open.

It will be apparent also that if either of the directional relays 54f and 54r fails to drop-out in proper manner upon deenergization of the windings thereof at the time that the car comes to a stop, the subsequent reversed flow of current in the circuit of the windings of the directional relays due to reversed travel causes a force to be exerted tending to positively restore the relay to its dropped-out position. Moreover, if either of the directional relays 54f and 54r fails to drop-out in a proper manner when the car comes to a stop, the continued illumination of the indicating lamp 61 will serve as an indication of this fact to the operator so that he may take the necessary steps to correct the fault before proceeding.

If either of the directional-repeater relays 55f and 55r happens to stick in its picked-up position and fails to drop-out properly in response to the opening of the pressure switch 44c at the time that the brakes are released in the manner presently to be described, the subsequent pick-up of the other directional-repeater relay will disconnect the generators 48 from and effect a short-circuiting of the windings a of the slip relays 53b, 53c, 53d so that no undesired operation thereof can occur. It will be seen that when the contacts e, f and g of the two repeater relays 55f and 55r are simultaneously in their picked-up positions, each correspondingly designated pair of contacts short-circuits the winding a of the corresponding slip relay and disconnects the corresponding generator 48.

In the case of the speed relays 52L, 52M, and 52H and the slip relay 53a, the simultaneous pick-up of contacts c and d of both the directional-repeater relays 55f and 55r will result in disconnecting the relays from the generator 48, in a manner readily apparent, although the relay windings are not short-circuited.

It will thus be seen that by means of the novel arrangement of the two directional relays 54f and 54r and directional-repeater relays 55f, 55r, it is practically impossible to secure improper operation of the equipment due to reversed travel.

*(e) Release of brakes*

After a vehicle has been brought to a stop and the operator desires to release the brakes prior to again starting the vehicle, he may do so simply by restoring the brake valve handle 17a to its brake release position. The fluid under pressure in the control pipe 16 is accordingly vented to atmosphere through the exhaust port and pipe 25 at the brake valve 17. The speed-controlled valve mechanism 27 operates in response to the reduction of pressure in the control pipe 16 to vent fluid under pressure from the pipe 35 and correspondingly from the relay valve section 41 of the slip-controlled valve devices 36 to atmosphere through the exhaust port of the relay valve section 28. The slip-controlled valve devices 36, in turn, operate to vent fluid under pressure from the brake cylinders 15 through the exhaust port of the relay valve sections 41. The brakes are accordingly completely released in response to the exhaust of fluid under pressure from the brake cylinders 15. The pressure switches 44f and 44r associated with the brake cylinders are accordingly restored to their open position. The pressure switch 44c is likewise restored to its open position in response to the reduction of the pressure in the control pipe 16 to atmospheric pressure.

The restoration of the pressure switch 44c to its open position interrupts the electrical circuits for all of the various relays and magnet valves except, of course, the directional relays 54f and 54r. Accordingly, it is impossible for current to be drained from the storage battery 64 as long as the brakes are released except in accordance with the demands of lighting circuits which may be supplied therefrom and which are not shown.

It is to be noted that the energizing circuit for the indicating lamp 61 is independent of the pressure switch 44c so that the operation of the indicating lamp is independent of the condition of the pressure switch 44c. Obviously, as previously indicated, if the two directional relays 54f and 54r both drop-out in their intended manner indicating lamp 61 will be extinguished when the car approaches a stop.

Although the directional relays 54r and 54f may drop out while the car is still traveling at a speed of four or five miles per hour, the directional-repeater relays 55f and 55r are not dropped-out correspondingly until the pressure switch 44c opens. Since the brakes are not completely released until after the car has come to a complete stop, it will therefore be apparent that the short-circuit connection including the series-related condenser 105 and winding $a$ of each of the slip relays 53b, 53c, and 53d effected by contacts $e$, $f$, and $g$ of the directional-repeater relays 55f and 55r when both of these relays are simultaneously dropped-out will not be established at a time the vehicle is in motion. The possible pick-up of the slip relays 53b, 53c, and 53d due to the momentary discharge of the condensers 105 associated therewith when one or the other of the directional-repeater relays 55f or 55r is restored to its dropped-out position may be effective to cause operation of the slip valve devices 36 to release fluid under pressure from the brake cylinders at this time. However, since the brakes are, in any case, being released this is an advantage rather than a disadvantage. Of course, once the pressure switch 44c opens due to reduction of pressure in control pipe 16, the slip-controlled valve devices will be restored to their normal condition due to interruption of the electrical circuits by pressure switch 44c.

In the case of the slip relay 53a, the restoration of one or the other of the directional-repeater relays 55f or 55r to its dropped-out position does not establish a short-circuit connection around the winding $a$ of the relay 53a and the associated condenser 105 and, consequently, no discharge flow of current through the winding $a$ sufficient in degree to cause pick-up of the contact member of this relay can occur. The condenser 105 associated with the relay 53a will in such case discharge through the circuit including the parallel connected windings $a$ of the speed relays 52L, 52M, and 52H. The resistance of this circuit is so high however that the current discharged from the condenser will be insufficient to cause pick-up of the slip relay 53a.

(f) Adaptation of equipment to a train of connected units or cars

In the case of a train of connected units or cars, either of the non-articulated or of the articulated type, the control of the brakes on all the units or cars by the operator is effected solely through the medium of the control pipe 16 which extends from car to car and which is controlled by a brake valve similar to the brake valve 17 on one or more of the cars. As previously indicated, if each of the cars is provided with a brake valve 17, those brake valves on the cars other than the power car on which the operator is stationed may be cut-out of operation by means of the manually operated valves 24 in the branch pipes leading to the brake valves.

While I have for simplicity shown a supply pipe 19 as extending from car to car throughout the train, it will be apparent that each individual unit of the car may be provided with an independent fluid pressure supply system including a fluid compressor and associated reservoir corresponding to the main reservoir 18. In such case, no connection between the sections of the supply pipe 19 on successive cars need be made.

The generators 48 associated with the wheels on all the units or cars will be identical in design and consequently produce substantially uniform voltages for a corresponding speed of rotation of the vehicle wheels. Accordingly, the speed-controlled valve mechanisms 27 on the different units or cars will be automatically controlled in synchronism so as to reduce the degree of application of the brakes on all cars in unison as the speed of the train reduces.

If for some reason, such as unequal wear of the wheels of different cars, and the consequent difference in diameter of the wheels, the voltage produced by the generators on different cars varies somewhat, the speed-controlled valve mechanisms 27 on different cars may not operate exactly in synchronism. However, such fact is not considered objectionable because of the fact that when any of the critical speed ranges is traversed and another speed range entered, the consequent change in the condition of the speed controlled valve mechanism does not result in a rapid adjustment of the pressure in the brake cylinder but rather an adjustment at a controlled rate so that the reduction from one degree of pressure to another effected by the valve mechanism 27 is not instantaneous. Accordingly, even if the speed controlled valve mechanisms 27 on different cars are not operated exactly in synchronism, the difference in the pressure of the brake cylinders on different cars will not vary by a substantial amount and consequently undesired slack action in the case of a train of non-articulated cars, will not occur. In the case of articulated cars, where no slack action can occur the fact that the brakes associated with the wheels of one unit may be braked a little more or a

SUMMARY

Summarizing, it will be seen that I have disclosed a novel brake control equipment adapted to a single car or a train of cars of either the non-articulated or the articulated type in which the operator located at a control station on one of the cars, such as a power car or locomotive, may control the brakes on all the cars uniformly and in which each individual unit or car is provided with apparatus for automatically decreasing the degree of application of the brakes independently of the operator in accordance with the reduction of speed of the car and for causing a rapid reduction in the degree of application of the brakes associated with individual wheel units or groups of wheel units in the event that any of the wheels of that group begin to slip, so as to cause the slipping wheels to be restored to a speed corresponding to car speed without causing sliding thereof.

The speed-control equipment for each car comprises, according to my invention, a plurality of voltage-responsive or speed relays of the so-called uni-directional type and associated relays and mechanism whereby to cause positive operation of the speed relays when a critical pick-up or drop-out point is reached. The arrangement is such as to cause the speed relays to pick-up when a certain speed of car travel is exceeded and to drop-out when the car speed reduces below the certain value.

The anti-wheel sliding equipment includes relays adapted to be picked-up only in response to a rate of rotative deceleration of the vehicle wheels occurring only when the wheels slip. According to my invention, the wheel-slip responsive relays are provided with a holding coil separate from the pick-up coil thereof and a self-holding contact which, when picked-up in response to operation of the relay, establishes a circuit for energizing a magnet valve device which causes a rapid reduction of the pressure in the brake cylinders associated with the slipping wheels and, at the same time, sets up the holding circuit for the holding coil of the relay to prevent the drop-out of the relay until such time as the pressure in the brake cylinder is reduced below a certain low pressure.

In view of the speed relays and slip relays being of the uni-directional type, I have provided a pair of so-called directional relays and a pair of directional-repeater relays for reversing the connections of the speed relays and slip relays to the generators associated with the corresponding wheel unit so as to insure the uni-directional flow of current through the pick-up coils of the speed relays, and in the case of the slip relays, uni-directional flow to the pick-up coils of the relays for deceleration of the wheels.

The directional control apparatus which I have provided is one of the features of my invention and is adapted to prevent the undesired operation or improper operation of any of the speed relays or wheel slip relays due to a change in polarity of generators associated with the vehicle wheels resulting from a reversal of travel of the car. The arrangement of the directional control apparatus is such as to normally maintain the circuits, on which the slip relays and speed relays operate, open so that the generators associated with the wheel units are normally unloaded and so that such circuits are established only during a brake application.

It should be understood that the herein-described arrangement for insuring positive operation of the relays 52L, 52M and 52H at critical control voltages is claimed in this application only in connection with brake control apparatus. The arrangement is more broadly claimed without reference to brake control apparatus in my copending applications, Serial No. 361,929 and Serial No. 395,907, filed October 19, 1940, and May 31, 1941, respectively.

While I have shown and described only one specific embodiment of my invention, it will be apparent that various omissions, additions, or modifications may be made in the equipment without departing from the spirit of my invention, as for example the provision of speed-control apparatus only, wheel-slip control apparatus only, or the provision of speed-control apparatus and wheel-slip control apparatus for one wheel unit only of a particular group of wheels or wheel units.

It is accordingly not my intention to limit the scope of my invention except in accordance with the terms of the appended claims.

Having now described my invention, what I claim as new and desire to secure by Letters Patent, is:

1. Brake control apparatus for a wheeled vehicle comprising, in combination, manually controlled means for establishing a control pressure variable according to a desired degree of application of the brakes, relay valve means effective in one condition thereof in response to a given control pressure to cause application of the brakes associated with the vehicle wheels to one degree and effective in response to said given control pressure in another condition thereof to cause application of the brakes associated with the vehicle wheels to a different degree, means for supplying a direct-current voltage substantially proportional to the rate of rotative speed of a vehicle wheel and of opposite polarity for opposite directions of rotation of said wheel, an electrical relay having an operating winding on which the voltage supplied by the voltage supply means is impressed and a movable element which is operatively actuated to and maintained in an operated position only so long as a voltage of one certain polarity and exceeding a certain value is impressed on the operating winding of the relay, means controlled according to the polarity of the voltage supplied by the voltage supply means for reversing the connections between the operating winding of the relay and said voltage supply means so that a voltage of the said one certain polarity is impressed on the operating winding of said relay whether the said wheel is rotating in one direction or the opposite direction, and means controlled according to the position of the control element of said relay for causing said relay valve means to be conditioned in its said one condition or its said different condition, whereby to vary the degree of application of the brakes dependent upon the speed of rotation of the vehicle wheel and accordingly the speed of travel of the vehicle.

2. Brake control apparatus for a wheeled vehicle comprising, in combination, manually controlled means for establishing a control fluid pressure variable according to a desire degree of application of the brakes, relay valve means adapted to be variously conditioned in any one of a plurality of different conditions and operative in response to a given control fluid pressure to establish different degrees of application of the brakes in the different conditions thereof, means for supplying a direct-current voltage substantially proportional to the speed of rotation of a vehicle wheel and of opposite polarity for opposite directions of rotation thereof, a plurality of electrical relays, each of said relays having an operating winding on which the voltage supplied by the voltage supply means is impressed and a control element which is actuated from a non-operated to an operated position and maintained in the operated position whenever and so long as the voltage impressed on the operating winding of the relay exceeds a certain voltage, the voltage adapted to effect operation of the control elements of the several relays from the non-operated to the operated positions thereof being different for each of said relays, means controlled according to the polarity of the voltage supplied by the voltage supply means for so controlling the connections between said electrical relays and said voltage supply means that, notwithstanding a reversal of polarity of the voltage supplied by the voltage supply means, a voltage of one certain polarity is impressed on the operating winding of each of said relays, and means controlled by said relays for varying the condition of said relay valve means whereby different degrees of application of the brakes are established dependent upon the speed of the vehicle.

3. Brake control apparatus for a wheeled vehicle comprising, in combination, manually controlled means for establishing a control fluid pressure variable according to a desired degree of application of the brakes, relay valve means operative in response to a given control pressure when in one condition to cause fluid at a certain pressure to be supplied to effect application of the brakes and operative in response to the given control pressure when in a different condition for causing fluid at a different pressure to be supplied to effect application of the brakes, means for supplying a direct-current voltage substantially proportional to the rotational speed of a wheel of the vehicle and of opposite polarity for opposite directions of rotation of said wheel, an electrical relay having an operating winding on which the voltage supplied by the voltage supply means is adapted to be impressed, said relay being actuated from a non-operated to an operated position only in response to a voltage of one certain polarity in excess of a certain value, means controlled according to the polarity of the voltage supplied by the voltage supply means for establishing connections between the operating winding of said relay and the said voltage supply means so that a voltage of said one certain polarity is impressed on the winding of the relay whether the wheel is rotating in one direction or the opposite direction, means controlled by the said control fluid pressure for preventing the last said means from establishing the connections between the operating winding of the relay and the voltage supply means unless said control fluid pressure exceeds a certain value, and means effective dependent upon whether said relay is in its operated or non-operated position to cause the relay valve means to be conditioned in its said one condition or its said different condition, whereby to cause variation in the degree of application of the brakes dependent upon the speed of the vehicle.

4. Brake control apparatus for a wheeled vehicle, comprising, in combination, means for effecting application and release of the brakes associated with the vehicle wheels, means for supplying a direct-current voltage substantially proportional to the rotative speed of a certain wheel of the vehicle and of opposite polarity depending upon the direction of rotation of said certain wheel, a pair of wires, a pair of electroresponsive devices one of which is operatively responsive only to a voltage of one certain polarity supplied by said voltage supply means and the other of which is operatively responsive only to a voltage of the opposite polarity supplied by said voltage supply means, said electroresponsive devices cooperating when either one only is operatively energized to establish a connection between said voltage supply means and said pair of wires whereby a voltage of one certain polarity is impressed on said pair of wires notwithstanding a reversal of polarity of the voltage supplied by the voltage supply means, and means controlled according to the voltage impressed on said pair of wires for controlling the degree of application of the brakes on the vehicle wheels.

5. Brake control apparatus for a wheeled vehicle, comprising, in combination, means for effecting application and release of the brakes associated with the vehicle wheels, means for supplying a direct-current voltage substantially proportional to the rotative speed of a certain wheel of the vehicle and of opposite polarity depending upon the direction of rotation of said certain wheel, a pair of wires, a pair of electroresponsive devices one of which is operatively responsive only to a voltage of one certain polarity supplied by said voltage supply means and the other of which is operatively responsive only to a voltage of the opposite polarity supplied by said voltage supply means, said electroresponsive devices cooperating when either one only is operatively energized to establish a connection between said voltage supply means and said pair of wires whereby a voltage of one certain polarity is impressed on said pair of wires notwithstanding a reversal of polarity of the voltage supplied by the voltage supply means, means for preventing the establishment of any connection between said voltage supply means and said pair of wires by said electroresponsive devices unless the brakes are applied, and means controlled according to the voltage impressed on said pair of wires for controlling the degree of application of the brakes on the vehicle wheels.

6. Brake control apparatus for a wheeled vehicle comprising, in combination, means for effecting application and release of the brakes associated with the vehicle wheels, means for supplying a direct-current voltage substantially proportional to the rotational speed of a certain vehicle wheel and of opposite polarity for opposite directions of rotation of said certain wheel, a pair of wires, two electrical relays each of which has an operating winding adapted to be energized by current supplied from said voltage supply means in accordance with the voltage, one of said relays being picked-up only in response to a current exceeding a certain value when the voltage supply means supplies a voltage of one polarity and the other of said relays being picked-up only in response to a current exceeding a certain value only when the voltage supply means supplies a voltage of the opposite polarity, two repeater relays one of which is adapted to be picked-up when said one relay is picked-up and the other of which is adapted to be picked-up when the other of said two relays is picked-up, said repeater relays having cooperating contacts whereby when both of said repeater relays are simultaneously in their dropped-out positions said pair of wires is disconnected from said voltage supply means and when either one only of said repeater relays is picked-up said pair of wires is connected to said voltage supply means in such a manner as to cause a voltage of one certain polarity to be impressed thereon notwithstanding a reversal of polarity of the voltage supplied by the voltage supply means, and means responsive to variation of the voltage impressed on said pair of wires for controlling the degree of application of the brakes on at least certain of said vehicle wheels.

7. Brake control apparatus for a wheeled vehicle comprising, in combination, means for effecting application and release of the brakes associated with the vehicle wheels, means for supplying a direct-current voltage substantially proportional to the rotational speed of a certain vehicle wheel and of opposite polarity for opposite directions of rotation of said certain wheel, a pair of wires, two electrical relays each of which has an operating winding adapted to be energized by current supplied from said voltage supply means in accordance with the voltage, one of said relays being picked-up only in response to a current exceeding a certain value when the voltage supply means supplies a voltage of one polarity and the other of said relays being picked-up only in response to a current exceeding a certain vale only when the voltage supply means supplies a voltage of the opposite polarity, two repeater relays one of which is adapted to be picked-up when said one relay is picked-up and the other of which is adapted to be picked-up when the other of said two relays is picked-up, means for preventing pick-up of either of said repeater relays unless the brakes are applied, said repeater relays having cooperating contacts whereby when both of said repeater relays are simultaneously in their dropped-out positions said pair of wires is disconnected from said voltage supply means and when either one only of said repeater relays is picked-up said pair of wires is connected to said voltage supply means in such a manner as to cause a voltage of one certain polarity to be impressed thereon notwithstanding a reversal of polarity of the voltage supplied by the voltage supply means, and means responsive to variation of the voltage impressed on said pair of wires for controlling the degree of application of the brakes on at least certain of said vehicle wheels.

8. Brake control apparatus for a wheeled vehicle comprising, in combination, means for effecting application and release of the brakes associated with the vehicle wheels, means for supplying a direct-current voltage substantially proportional to the rotational speed of a certain vehicle wheel and of opposite polarity for opposite directions of rotation of said certain wheel, a pair of wires, two electrical relays each of which has an operating winding adapted to be energized by current supplied from said voltage supply means in accordance with the voltage, one of said relays being picked-up only in response to a current exceeding a certain value when the voltage supply means supplies a voltage of one polarity and the other of said relays being picked-up only in response to a current exceeding a certain value only when the voltage supply means supplies a voltage of the opposite polarity, two repeater relays one of which is adapted to be picked-up when said one relay is picked-up and the other of which is adapted to be picked-up when the other of said two relays is picked-up, said repeater relays having cooperating contacts whereby when both of said repeater relays are simultaneously in their dropped-out positions or simultaneously in their picked-up positions said pair of wires is disconnected from said voltage supply means and when either one only of said repeater relays is picked-up said pair of wires is connected to said voltage supply means in such a manner as to cause a voltage of one certain polarity to be impressed thereon notwithstanding a reversal of polarity of the voltage supplied by the voltage supply means, and means responsive to variation of the voltage impressed on said pair of wires for controlling the degree of application of the brakes on at least certain of said vehicle wheels.

9. Brake control apparatus for a wheeled vehicle comprising, in combination, means for effecting application and release of the brakes associated with the vehicle wheels, means for supplying a direct-current voltage substantially proportional to the rotational speed of a certain wheel of the vehicle and of opposite polarity for opposite directions of rotation of said certain wheel, a pair of wires, two directional relays having operating windings on which the voltage supplied by the voltage supply means is constantly impressed and respectively so arranged that one of said relays is picked-up in response to a current exceeding a certain value only when the voltage supply means supplies a voltage of one polarity and the other of said relays is picked-up in response to a current exceeding said certain value only when the voltage supply means supplies a voltage of the opposite polarity, two repeater relays, a switch controlled by said brake application and brake release effecting means, a circuit for operatively energizing one of said repeater relays under the joint control of said one directional relay and said switch to cause said one repeater relay to be picked-up only when said one directional relay is picked-up and when the application of the brakes exceeds a certain degree, a circuit for operatively energizing the other of said repeater relays under the joint control of the other of said directional relays and said switch to cause said other repeater relay to be picked-up only when the other of said directional relays is picked-up and when the application of the brakes exceeds a certain degree, said repeater relays having cooperating contacts so arranged and connected that when both of said repeater relays are dropped-out said pair of wires is disconnected from said voltage supply means and that when either one only of said repeater relays is picked-up a voltage of one certain polarity is impressed on said pair of wires notwithstanding a reversal of polarity of the voltage supplied by the voltage supply means, and means responsive to variation of the voltage impressed on said pair of wires for effecting variations in the degree of application of the brakes on at least certain of the vehicle wheels.

10. Brake control apparatus for a wheeled vehicle comprising, in combination, means for effecting application and release of the brakes associated with the vehicle wheels, means for supplying a direct-current voltage substantially proportional to the rotational speed of a certain wheel of the vehicle and of opposite polarity for opposite directions of rotation of said certain wheel, a pair of wires, two directional relays having operating windings on which the voltage supplied by the voltage supply means is constantly impressed and respectively so arranged that one of said relays is picked-up in response to a current exceeding a certain value only when the voltage supply means supplies a voltage of one polarity and the other of said relays is picked-up in response to a current exceeding said certain value only when the voltage supply means supplies a voltage of the opposite polarity, two repeater relays, a switch controlled by said brake application and brake release effecting means, a circuit for operatively energizing one of said repeater relays under the joint control of said one directional relay and said switch to cause said one repeater relay to be picked-up only when said one directional relay is picked-up and when the application of the brakes exceeds a certain degree, a circuit for operatively energizing the other of said repeater relays under the joint control of the other of said directional relays and said switch to cause said other repeater relay to be picked-up only when the other of said directional relays is picked-up and when the application of the brakes exceeds a certain degree, said repeater relays having cooperating contacts so arranged and connected that when both of said repeater relays are dropped-out said pair of wires is disconnected from said voltage supply means and that when either one only of said repeater relays is picked-up a voltage of one certain polarity is impressed on said pair of wires notwithstanding a reversal of polarity of the voltage supplied by the voltage supply means, each of said repeater relays also having a self-holding contact adapted to establish a self-holding circuit for maintaining the corresponding repeater relay picked-up subject to the control of said switch independently of the corresponding directional relay as long as the application of the brakes exceeds said certain degree, and means responsive to variation of the voltage impressed on said pair of wires for effecting variation in the degree of application of the brakes on at least certain of the vehicle wheels.

11. Brake control apparatus for a wheeled vehicle comprising, in combination, means under the control of the operator of the vehicle for establishing a control fluid pressure variable according to a desired degree of application of the brakes, relay valve means adapted to be variously conditioned so as to supply fluid at a pressure having any one of a plurality of different ratios to the given control pressure to effect application of the brakes associated with the vehicle wheels, means for supplying a direct-current voltage substantially proportional to the rotational speed of a certain vehicle wheel and of opposite polarity for opposite directions of rotation of said certain wheel, electric relay means responsive to variations of the voltage supplied by the voltage supply means for effecting variations in the condition of said relay valve means whereby to effect variations in the degree of application of the brakes associated with the vehicle wheels dependent upon variations in the speed of the vehicle, and means effective when the voltage supply means fails to supply voltage for causing the relay valve means to be conditioned to supply fluid at a pressure having one certain one of said plurality of ratios to the control pressure.

12. Brake control apparatus for a wheeled vehicle comprising, in combination, means under the control of the operator for establishing a control fluid pressure variable according to a desired degree of application of the brakes, relay valve means including an electroresponsive means effective when deenergized to cause the relay valve means to operate in response to a given control pressure to supply fluid at a pressure having a certain ratio to the control pressure and when energized to cause the relay valve means to operate in response to the given control pressure to supply fluid at a pressure having a lower ratio to the control pressure, means for supplying a voltage substantially proportional to the rotational speed of a vehicle wheel, means responsive to a voltage supplied by the voltage supply means exceeding a certain value for causing the electroresponsive means of said relay valve means to be deenergiezd and responsive to a voltage supplied by the voltage supply means below said certain value to cause the electroresponsive means of the relay valve means to be energized, and means effective upon the failure of the voltage supply means to supply voltage for preventing the voltage responsive means from effecting energization of said electroresponsive means of the relay valve means.

13. Brake control apparatus for a wheeled vehicle comprising, in combination, means under the control of the operator for establishing a control fluid pressure variable according to a desired degree of application of the brakes, relay valve means including an electroresponsive device effective when deenergized to cause the relay valve means to operate in response to a given control fluid pressure to supply fluid, to effect application of the brakes, at a pressure which is a certain percentage of the control fluid pressure and effective when energized to cause the relay valve means to operate in response to said given control fluid pressure to supply fluid, to effect application of the brakes, at a pressure which is a lower percentage of the control fluid pressure, means for supplying a direct-current voltage substantially proportional to the rotational speed of a vehicle wheel and of opposite polarity for opposite directions of rotation of said certain wheel, a pair of wires, means controlled according to the polarity of the voltage supplied by the voltage supply means and effective when the voltage supplied exceeds a certain value for establishing connections between the said pair of wires and the voltage supply means so that, notwithstanding a reversal of polarity of the voltage supplied by the voltage supply means, a voltage of one certain polarity is impressed on said pair of wires, and means responsive to the voltage impressed on said pair of wires and effective when the voltage exceeds a certain value for causing deenergization of the electroresponsive device of said relay valve means and when the voltage on said pair of wires is less than said certain value for causing energization of said electroresponsive device, said polarity controlled means being effective when the voltage supplied by the voltage supply means is insufficient to effect operation thereof for preventing energization of the electroresponsive device of the relay valve means notwithstanding the operation of the voltage responsive means tending to cause energization thereof.

14. Brake control apparatus for a wheeled vehicle comprising, in combination, means under the control of the operator for establishing a control fluid pressure variable according to a desired degree of application of the brakes, variously conditionable means operatively responsive to a given control fluid pressure for supplying fluid at a pressure having any one of a plurality of different ratios to the control fluid pressure depending on the condition thereof, means for supplying a voltage substantially proportional to the rotational speed of a certain vehicle wheel, a pair of wires, means effective after the said control fluid pressure exceeds a certain value for causing the voltage supplied by the voltage supply means to be impressed on said pair of wires, and means responsive to the voltage impressed on said pair of wires for causing the variously conditionable means to be conditioned differently for different ranges of voltage.

15. Brake control apparatus for a wheeled vehicle, comprising, in combination, means under the control of the operator for effecting application and release of the brakes associated with the wheels of the vehicle, means for supplying a voltage substantially proportional to the rotational speed of a certain vehicle wheel, a pair of wires on which the voltage supplied by the voltage supply means is impressed, a plurality of electrical relays each having an operating winding effective in response to an energizing current in excess of a certain value for causing pick-up of the relay, a first resistor connected in series relation with the operating winding of one of said relays across said pair of wires and of such resistance as to cause energization of the winding of said one relay by a current exceeding said certain value when the voltage impressed on said pair of wires exceeds a certain value, a second resistor connected in series relation with the operating winding of a second one of said relays across said pair of wires and of such resistance as to cause energization of the operating winding of said second relay by a current exceeding said certain value only when the voltage across said pair of wires exceeds a second certain value higher than said first said certain value, and a third resistor connected in series relation with the operating winding of a third one of said relays across said pair of wires and of such a resistance as to cause energization of the operating winding of said third relay by a current exceeding said certain value only when the voltage impressed on the said pair of wires exceeds a third certain value higher than the said second certain value, and means controlled by said relays for controlling the degree of application of the brakes.

16. Brake control apparatus for a wheeled vehicle comprising, in combination, means for effecting application and release of the brakes associated with the wheels of the vehicle, means for supplying a voltage substantially proportional to the rotational speed of a certain vehicle wheel, a pair of wires on which the voltage supplied by the voltage supply means is impressed, an electrical relay having an operating winding, a resistor connected in series relation with the operating winding of said relay across said pair of wires, means controlled by said relay for controlling a shunt connection around a portion of said resistor in such a manner as to cause pick-up operation of said relay when the voltage across said pair of wires increases above a certain value and drop-out operation of said relay when the voltage across said pair of wires decreases below a value substantially the same as said certain value, and means controlled by said relay for causing one degree of application of the brakes to be effected in response to a given operation of the first said means when said relay is dropped-out and a different degree of application of the brakes to be effected in response to the said given operation of the first said means when the said relay is picked-up.

17. Brake control apparatus for a wheeled vehicle comprising, in combination, means under the control of the operator for effecting application and release of the brakes associated with the vehicle wheels, means for supplying a voltage substantially proportional to the rotational speed of a certain vehicle wheel, an electrical relay having two separate windings, one of which windings is energized according to the voltage supplied by the voltage supply means and effective to cause pick-up of said relay when the energizing voltage increases above a certain value, a second relay having two separate windings one of which is effective when energized to cause pick-up of the second relay and the other of which is connected in a loop circuit with the other of the two windings of the first said relay, the first said relay being effective when picked-up to cause deenergization of the said one winding of said second relay to cause it to drop-out, the other of the windings of said second relay having a momentary voltage induced therein upon deenergization of the said one winding of said second relay whereby to cause an energizing current to flow through the other winding of the first said relay in a direction to assist the said one winding of the first said relay to cause pick-up operation of said relay, and means controlled by said second relay for effecting variation of the degree of application of the brakes.

18. Brake control apparatus for a wheeled vehicle comprising, in combination, means under the control of the operator for effecting application and release of the brakes associated with the vehicle wheels, means for supplying a voltage substantially proportional to the rotational speed of a certain vehicle wheel, an electrical relay having a pick-up winding and an auxiliary winding, the pick-up winding of said relay being effective in response to an increase of the voltage supplied by the voltage supply means above a certain value to cause pick-up of the relay and adapted when the voltage supplied by the voltage supply means reduces below a value substantially the same as said certain value for causing drop-out of the relay, a second relay having a pick-up winding and an additional winding, said second relay being picked-up upon energization of the pick-up winding thereof and dropped-out upon deenergization thereof, and the relation of the pick-up and additional winding of said second relay being such that upon energization of the pick-up winding a momentary voltage of one polarity is induced in the additional winding of the relay and upon deenergization of the pick-up winding a momentary induced voltage of opposite polarity is induced in the additional winding of the relay, means connecting the auxiliary winding of the first said relay and the additional winding of said second relay, means effective when the first said relay is dropped-out to effect energization of the pick-up winding of said second relay and when the first said relay is picked-up to effect deenergization thereof, the polarity of the momentary induced voltage in the additional winding of said second relay upon energization and deenergization of the pick-up winding of said second relay being such that the current flow through the auxiliary winding of the first said relay caused thereby is in a direction to assist the pick-up winding of the first said relay to pick-up when the pick-up winding of the second relay is deenergized and in the opposite direction so as to oppose the pick-up winding of the first said relay so as to assist in causing drop-out of the first said relay when the pick-up winding of the second relay is energized, and means controlled by said second relay for effecting variation of the degree of application of the brakes.

19. Brake control apparatus for a wheeled vehicle comprising, in combination, means under the control of the operator for effecting application and release of the brakes associated with the vehicle wheels, means for supplying a voltage substantially proportional to the rotational speed of a certain vehicle wheel, a pair of electrical relays, means responsive to variation of the voltage supplied by the voltage supply means for causing one or the other of said relays to be picked-up or both of said relays to be simultaneously picked-up or simultaneously dropped-out, and means controlled by said relays for causing different degrees of application of the brakes to be effected in response to a given operation of said operator controlled means dependent upon which of said two relays is picked-up or dropped-out and whether both of said relays are picked-up simultaneously or dropped-out simultaneously.

20. Brake control apparatus for a wheeled vehicle comprising, in combination, means under the control of the operator for effecting application and release of the brakes associated with the vehicle wheels, means for supplying a voltage substantially proportional to the rotational speed of a certain vehicle wheel, two electrical relays, means responsive to variation of the voltage supplied by the voltage supply means for so controlling said relays as to cause one of said relays to be picked-up and the other of said relays to be dropped-out as long as the voltage supplied to the voltage supply means is less than a certain value, for causing both of said relays to be dropped-out as long as the voltage supplied by the voltage supply means is greater than said certain value but less than a second certain value, for causing only the other of said relays to be picked-up when the voltage supplied by the voltage supply means is greater than said second certain value but less than a third certain value, and for causing pick-up of both of said relays when the voltage supplied by the voltage supply means exceeds said third certain value, and means controlled by said relays for causing one degree of application of the brakes to be effected in response to a given operation of the operator controlled means when only the said one relay is picked-up, a second degree of application of the brakes higher than said one degree to be effected in response to the given operation of the operator controlled means when both of said relays are dropped-out, a third degree of application of the brakes higher than said second degree to be effected in response to the given operation of the operator controlled means when the other of said relays only is picked-up, and a fourth degree of application of the brakes higher than said third degree to be effected in response to the given operation of the operator controlled means when both of said relays are picked-up simultaneously.

21. Brake control apparatus for a wheeled vehicle comprising, in combination, means under the control of the operator for establishing a control fluid pressure variable in accordance with a desired degree of application of the brakes, relay valve means including a first electroresponsive means, a second electrorepsonsive means and a third electroresponsive means energizable or deenergizable selectively in different combinations, said relay valve means being operative in response to a given control fluid pressure for causing fluid to be supplied to effect application of the brakes at one pressure when said first said electroresponsive means only is energized, to supply fluid at a second pressure higher than said one pressure when none of said electroresponsive means are energized, to supply fluid at a third pressure higher than said second pressure when said second electroresponsive means only is energized, and to supply fluid at a fourth pressure higher than said third pressure when said second and said third electroresponsive means are simultaneously energized while the said first electroresponsive means is deenergized, means for supplying a voltage substantially proportional to the rotational speed of a certain vehicle wheel, a pair of electrical relays, means responsive to variations in the voltage supplied by the voltage supply means for causing one of said relays only to be picked-up when the voltage supplied by the voltage supply means is less than one certain value, for causing both of said relays to be dropped-out when the voltage supplied by the voltage supply means is higher than said one certain value but less than a second certain value higher than the said one certain value, for causing the other of said two relays only to be picked-up when the voltage supplied by the voltage supply means is higher than said second certain value but less than a third certain value higher than said second certain value, and for causing simultaneous pick-up of both of said relays when the voltage supplied by the voltage supply means exceeds said third certain value, said two relays functioning cooperatively so as to effect energization of only the first said electroresponsive means of the relay valve means when only the said one relay is picked-up, for effecting deenergization of all of said electroresponsive means when both of said relays are dropped-out, for effecting energization of only the said second responsive means when only the other of said two relays is picked-up, and for effecting simultaneous energization of said second and said third electroresponsive means when both of said two relays are picked-up.

22. Brake control apparatus for a wheeled vehicle comprising, in combination, means under the control of the operator for effecting application and release of the brakes associated with the vehicle wheels, means for supplying a voltage substantially proportional to the rotational speed of a certain vehicle wheel, three relays each of which has an operating winding on which the voltage supplied by the voltage supply means is impressed and an auxiliary winding, one of said speed relays being picked-up whenever the voltage supplied by the voltage supply means exceeds a certain value, a second of said speed relays being picked-up only when the voltage supplied by the voltage supply means exceeds a second certain value higher than the first said certain value, and the third of said speed relays being picked-up only when the voltage supplied by the voltage supply means exceeds a third certain value higher than said second certain value, two auxiliary relays each having an operating winding and an additional winding, the operating winding of each auxiliary relay being effective, when energized, to cause pick-up of the relay and a momentary induced voltage of one polarity in the additional winding thereof and, when deenergized, to cause the relay to drop-out and a momentary induced voltage in the additional winding thereof of the opposite polarity, means effective during an application of the brakes to cause energization of the operating winding of one of said auxiliary relays, said one speed relay being effective when picked-up to establish a shunt connection around the operating winding of said one auxiliary relay whereby to cause deenergization of the operating winding thereof and drop-out of the relay, the resulting momentary induced voltage in the additional winding of said one auxiliary relay being effective while the other of said two auxiliary relays is dropped-out to cause a flow of current through the auxiliary winding of the said one speed relay in a direction to assist the operating winding thereof in effecting pick-up of that speed relay, said second speed relay being effective when picked-up to cause energization of the operating winding of the other of said two auxiliary relays, the resulting momentary induced voltage in the additional winding of said other auxiliary relay being effective to cause a flow of current through the auxiliary winding of the said second speed relay in a direction to assist the operating winding thereof in effecting pick-up of that speed relay, said other of the two relays being effective when picked-up to interrrupt the connection between the auxiliary winding of the said one speed relay and the additional winding of the said one of the two auxiliary relays and establish a connection between the auxiliary winding of said third speed relay winding and the said additional winding of the said one of the two auxiliary relays and also operative when picked-up to render the said third speed relay effective to energize the operating winding of said one of the two auxiliary relays, said third speed relay being effective when picked-up to cause energization of the operating winding of said one of the two auxiliary relays whereby such relay is picked-up and a momentary voltage induced in the additional winding thereof to cause a current to flow through the auxiliary winding of the third speed relay in a direction to assist the operating winding thereof in effecting pick-up of the third speed relay, and means controlled by said two relays effective to cause different degrees of application of the brakes for a given operation of said operator-controlled means depending upon whether said one of the two auxiliary relays only is picked-up, the other of said two auxiliary relays only is picked-up, both of said auxiliary relays are simultaneously picked-up or both of said two auxiliary relays are simultaneously dropped-out.

23. Brake control apparatus for a wheeled vehicle comprising, in combination, means under the control of the operator for effecting application and release of the brakes associated with a vehicle wheel, an electrical relay having a pick-up winding and a holding winding, said relay being picked-up only when the pick-up winding is energized by a current exceeding a certain value and maintained picked-up independently of the current in the pick-up winding when the holding winding is energized, means for energizing the pick-up winding of said relay by a current exceeding said certain value so as to cause pick-up thereof only when the rate of rotative deceleration of said vehicle wheel exceeds a certain rate, means for effecting energization of the holding winding of said relay upon the pick-up thereof, means effective as long as the said relay is picked-up for effecting a continued rapid reduction in the degree of application of the brakes associated with said wheel, and means effective when the degree of application of the brakes reduces below a certain value in response to the operation of the last said means for effecting deenergization of the holding winding of said relay.

24. Brake control apparatus for a wheeled vehicle comprising, in combination, a brake cylinder effective upon the supply of fluid under pressure thereto to effect application of the brakes associated with a vehicle wheel and upon the exhaust of fluid under pressure therefrom to effect the release of the brakes, means under the control of of the operator for effecting the supply of fluid under pressure to and the release of fluid under pressure from said brake cylinder, an electrical relay having a pick-up winding and a holding winding, said relay being picked-up when the pick-up winding is energized by a current exceeding a certain value and maintained pick-up when the holding winding is energized independently of the current energizing the pick-up winding, means for effecting energization of the pick-up winding by a current exceeding said certain value only when the said vehicle wheel rotatively decelerates at a rate exceeding a certain rate, said relay being effective when picked-up to cause energization of said holding winding, means responsive to the pick-up of said relay for initiating a rapid reduction in the pressure of the fluid in the brake cylinder and continuing such reduction as long as the relay is picked-up, and means responsive to the reduction of the pressure in the brake cylinder to below a certain value for effecting deenergization of the holding winding of said relay.

25. Brake control apparatus for a wheeled vehicle comprising, in combination, means under the control of the operator for effecting application and release of the brakes associated with the vehicle wheels; electroresponsive means effective when deenergized to permit the control of the brakes and when energized to prevent the control of the brakes associated with one or more wheel units under the control of the operator controlled means and to effect a rapid reduction in the degree of application of the brakes associated with said one or more wheel units; an electrical relay having a pick-up winding, a holding winding and a contact actuated to a closed position in response to pick-up of the relay; means for causing energization of the pick-up winding of said relay by a current substantially proportional to the rate of rotative deceleration of one of said wheel units; said pick-up winding of the relay being effective to cause actuation of the contact of the relay to closed position only when energized by a current exceeding a certain value and corresponding to a rate of rotative deceleration of said one wheel unit in excess of a certain rate, the contact of said relay being effective when actuated to its picked-up or closed position to effect energization of the holding winding of said relay and of the electroresponsive means to cause said holding winding to maintain the contact in its closed position independently of the current energizing the pick-up winding thereof; and switch means responsive to the reduction in the degree of application of the brakes associated with said wheel units below a certain value in response to the operation of the electroresponsive means for effecting deenergization of the holding winding of said relay and of said electroresponsive means.

26. Brake control apparatus for a wheeled vehicle, comprising, in combination, means under the control of the operator for effecting application and release of the brakes associated with the vehicle wheels, electroresponsive means effective when deenergized to permit the control of the brakes associated with a certain two separately rotatable wheels of the vehicle and effective upon energization to prevent the control of the brakes associated with said two wheels and effect a rapid reduction in the degree of application of the brakes associated with said two wheels, two electrical relays one of which has a pick-up winding and a holding winding and the other of which has a pick-up winding, means for effecting energization of the pick-up winding of the one of said relays by a current exceeding a certain value necessary to cause pick-up of the relay only when the one of said two wheels slips, means for causing the pick-up winding of the other of said relays to be energized by a current exceeding a certain value necessary to cause pick-up of the relay only when the other of said two wheels slips, said two relays having contacts arranged in parallel relation and effective when the either of said relays is picked-up to cause energization of the holding winding of said one relay and energization of said electroresponsive means, said holding winding of said one relay being effective to maintain the contact of said one relay in a picked-up position independently of the current energizing the pick-up winding of said relay, and switch means responsive to the reduction in the degree of application of the brakes associated with said two wheels, caused by energization of said electroresponsive means, below a certain value for effecting deenergization of said electroresponsive means and of the holding winding of said one relay.

27. Brake control apparatus for a wheeled vehicle comprising, in combination, a brake cylinder effective upon the supply of fluid under pressure thereto to effect application of the brakes associated with a vehicle wheel and upon the release of fluid under pressure therefrom to effect a release of the brakes, means under the control of the operator for causing fluid undr pressure to be supplied to said brake cylinder to effect application of the brakes associated with said wheel, electroresponsive means effective when deenergized to permit the supply of fluid under pressure to the brake cylinder under the control of the operator controlled means and effective when energized to cause interruption of the supply of fluid under pressure to the brake cylinder and the exhaust of fluid under pressure therefrom at a rapid rate, an electrical relay having a pick-up winding and a holding winding, means for effecting energization of the pick-up winding of said relay by a current exceeding a certain value necessary to cause pick-up of the relay only when the rate of rotative deceleration of said wheel exceeds a certain rate, said relay being effective when picked-up to effect energization of the holding winding of said relay and energization of said electroresponsive means, said holding winding of said relay being effective to maintain the relay picked-up independently of the current energizing the pick-up winding of said relay, and a pressure operated switch responsive to the reduction of the pressure in the brake cylinder to below a certain pressure in response to energization of the electroresponsive means for effecting deenergization of said holding winding of said relay and said electroresponsive means.

28. Brake control apparatus for a wheeled vehicle comprising, in combination, at least one brake cylinder effective upon the supply of fluid under pressure thereto to cause application of the brakes associated with two separately rotatable wheels of the vehicles and upon the release of fluid under pressure therefrom to effect the release of such brakes, means under the control of the operator for causing fluid under pressure to be supplied to and released from the brake cylinder, electroresponsive means effective when deenergized to permit the supply of fluid under pressure to the brake cylinder and release therefrom under the control of the operator controlled means and upon energization to prevent the supply of fluid under pressure to the brake cylinder under the control of the operator controlled means and to effect independently thereof a rapid reduction of the pressure in the brake cylinder, two electrical relays one of which has a pick-up winding and a holding winding and the other of which has a pick-up winding, means for causing energization of the pick-up winding of said one relay by a current substantially proportional to the rate of rotative deceleration of one of said wheels, means for causing energization of the pick-up winding of the other of said relays by a current substantially proportional to the rate of rotative deceleration of the other of said wheels, the pick-up winding of each of said two relays being effective to cause pick-up of the relay only when the current energizing the pick-up winding exceeds a certain value corresponding to rotative deceleration of the corresponding wheel at the rate exceeding a certain rate and occurring only when the wheel slips, said two relays having respective contacts connected in parallel relation and effective upon pick-up of either of said relays to establish a circuit for energizing the holding winding of said one relay and the electroresponsive means, the holding winding of said one relay being effective when energized to maintain the said one relay picked-up independently of the current energizing the pick-up winding thereof, and a pressure-responsive switch effective when the pressure in the brake cylinder is reduced below a certain value in response to the energization of said electroresponsive means for effecting deenergization of the holding winding of said one relay and deenergization of the electroresponsive means.

29. Brake control apparatus for a wheeled vehicle of the type having means under the control of the operator for effecting application and release of the brakes associated with the vehicle wheels comprising, in combination, brake control means for varying the degree of application of the brakes, a pair of cooperating electrical relays functioning jointly when one of said relays is energized to cause the brake control means to be conditioned to cause one degree of application of the brakes, functioning jointly when both of said relays are deenergized to cause the brake control means to be conditioned to effect a second degree of application of the brakes higher than said one degree, functioning jointly when the other of said relays is energized to cause the brake control means to be conditioned to effect a third degree of application of the brakes higher than said second degree, and functioning jointly when both of said relays are simultaneously energized for conditioning the brake control means to cause application of the brakes to a fourth degree higher than said third degree, and means responsive to the speed of the vehicle and effective over progressively increasing speed ranges to selectively energize only said one relay, deenergize both of said relays, energize only the other of said relays, and energize both of said relays, in succession.

30. Brake control apparatus for a wheeled vehicle of the type having means under the control of the operator for effecting application of the brakes associated with the vehicle wheels comprising, in combination, a pair of electrical relays, means operatively responsive to the speed of the vehicle for selectively energizing either one only or both of said relays simultaneously or deenergizing both of said relays simultaneously throughout each of a plurality of different speed ranges depending upon the particular speed range in which the vehicle is traveling, and brake control means controlled by said pair of relays for causing a different degree of application of the brakes to be established for each of said speed ranges.

31. Brake control apparatus for a wheeled vehicle of the type having means under the control of the operator for effecting application and release of the brakes associated with the vehicle wheels comprising, in combination, a pair of current-responsive devices, means responsive to the speed of the vehicle for energizing only one of said current-responsive devices throughout a first speed range, for energizing only the other of said current-responsive devices throughout a second speed range, for deenergizing both of said current-responsive devices simultaneously throughout a third speed range, and for energizing both of said current-responsive devices simultaneously throughout a fourth speed range, and brake control means variously conditioned under the control of said current-responsive devices for causing any one of a plurality of different degrees of application of the brakes to be effected in accordance with the particular speed range in which the vehicle travels.

32. Brake control apparatus for a wheeled vehicle comprising, in combination, means under the control of the operator for effecting application and release of the brakes associated with the vehicle wheels, means for supplying a voltage substantially proportional to the speed of a certain vehicle wheel, an electrical relay having two separate windings one of which windings is energized according to the voltage supplied by the voltage supply means and is effective to cause pick-up of said relay when the energizing voltage increases above a certain value, means including a winding in which a voltage is momentarily established by electromagnetic induction in response to pick-up of said relay for causing momentary energization of the other winding of said relay in a manner to assist the said one winding of the relay to cause pick-up of the relay, and means controlled by said relay for controlling the degree of application of the brakes associated with the vehicle wheels.

33. Brake control apparatus for a wheeled vehicle comprising, in combination, means under the control of the operator for effecting application and release of the brakes associated with the vehicle wheels, means for supplying a voltage substantially proportional to the rotational speed of a certain vehicle wheel, an electrical relay having two separate windings one of which windings is energized in accordance with the voltage supplied by the voltage-supply means, means for causing said relay to be picked-up when the voltage supplied by the voltage-supply means exceeds a certain value and dropped-out when the voltage supplied by the voltage-supply means decreases below a value substantially equal to the said certain value, means including a winding in which a voltage is momentarily established by electromagnetic induction in response to the drop-out of said relay for effecting momentary energization of the other winding of said relay in a manner opposing the effect of the said one winding of the relay so as to insure positive drop-out of the relay, and means controlled by said relay for controlling the degree of the application of the brakes associated with the vehicle wheels.

ANDREW J. SORENSEN.